United States Patent
Umeno

(10) Patent No.: US 7,548,618 B2
(45) Date of Patent: Jun. 16, 2009

(54) CONVERTER, ENCRYPTION/DECRYPTION SYSTEM, MULTI-STAGE CONVERTER, CONVERTING METHOD, MULTI-STAGE CONVERTING METHOD, PROGRAM, AND INFORMATION RECORDING MEDIUM

(75) Inventor: Ken Umeno, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 752 days.

(21) Appl. No.: 10/233,119

(22) Filed: Aug. 29, 2002

(65) Prior Publication Data
US 2003/0044008 A1    Mar. 6, 2003

(30) Foreign Application Priority Data
Aug. 30, 2001    (JP) .............................. 2001-261698

(51) Int. Cl.
*H04L 9/00* (2006.01)
*H01R 11/00* (2006.01)
(52) U.S. Cl. .......................... 380/44; 380/200; 380/255
(58) Field of Classification Search ................. 380/200, 380/255
See application file for complete search history.

(56) References Cited

U.S. PATENT DOCUMENTS

| | | | | |
|---|---|---|---|---|
| 4,202,051 A | * | 5/1980 | Davida et al. | 380/46 |
| 4,747,139 A | * | 5/1988 | Taaffe | 380/44 |
| 4,799,259 A | * | 1/1989 | Ogrodski | 380/46 |
| 5,008,935 A | * | 4/1991 | Roberts | 380/29 |
| 5,048,086 A | * | 9/1991 | Bianco et al. | 380/28 |
| 5,159,633 A | * | 10/1992 | Nakamura | 380/30 |
| 5,163,092 A | * | 11/1992 | McNesby et al. | 380/28 |
| 5,177,790 A | * | 1/1993 | Hazard | 380/28 |

(Continued)

FOREIGN PATENT DOCUMENTS

JP    06-296175    10/1994

(Continued)

OTHER PUBLICATIONS

Masuda and Aihara, "Chaotic Cipher by Finite-State Baker's Map," IEICE Trans. On Communication, Jul. 1999, vol. J82-A, No. 7, pp. 1042-1046.

*Primary Examiner*—Nasser G Moazzami
*Assistant Examiner*—Chinwendu C Okoronkwo
(74) *Attorney, Agent, or Firm*—Mitchell P. Brook; Luce, Forward, Hamilton & Scripps LLP

(57) ABSTRACT

A converter uses a predetermined parameter a. A generating unit accepts generated inputs $x_1, \ldots, x_n$, and generates generated outputs, $y_1, \ldots, y_n$, using recurrence formulas, $y_1 = F_1(x_1, a)$ and $y_{i+1} = F_{i+1}(x_{i+1}, y_i)$ ($1 \leq i \leq n-1$). A key accepting unit accepts key inputs, $k_1, \ldots, k_n$, and gives them as generated inputs to said generating unit. A repetition controller gives the generated outputs as generated inputs to said generating unit, for an "m" ($m \geq 0$) number of times, and sets one of the generated outputs to be given at the end as a random number string, $r_1, \ldots, r_n$. The data accepting unit accepts data inputs, $d_1, \ldots, d_n$. The converting unit converts data using, $e_i = d_i \star r_i$, and, outputs data outputs, $e_1, \ldots, e_n$. The converter can be used both for encrypting and decrypting data.

10 Claims, 15 Drawing Sheets

U.S. PATENT DOCUMENTS

| | | | |
|---|---|---|---|
| 5,241,602 A * | 8/1993 | Lee et al. | 380/268 |
| 5,257,282 A * | 10/1993 | Adkisson et al. | 708/253 |
| 5,267,316 A * | 11/1993 | Merino Gonzalez et al. | 380/28 |
| 5,327,365 A * | 7/1994 | Fujisaki et al. | 708/254 |
| 5,440,640 A * | 8/1995 | Anshel et al. | 380/46 |
| 5,787,179 A * | 7/1998 | Ogawa et al. | 380/46 |
| 5,799,090 A * | 8/1998 | Angert | 380/43 |
| 6,078,667 A * | 6/2000 | Johnson | 380/44 |
| 6,094,486 A * | 7/2000 | Marchant | 380/52 |
| 6,236,728 B1 * | 5/2001 | Marchant | 380/28 |
| 6,240,183 B1 * | 5/2001 | Marchant | 380/28 |
| 6,275,586 B1 * | 8/2001 | Kelly | 380/46 |
| 6,301,361 B1 * | 10/2001 | Mischenko et al. | 380/28 |
| 6,324,287 B1 * | 11/2001 | Angert | 380/43 |
| 6,393,125 B1 * | 5/2002 | Barbir | 380/22 |
| 6,404,888 B1 * | 6/2002 | Barbir | 380/22 |
| 6,961,426 B2 * | 11/2005 | Vesely | 380/42 |
| 7,006,633 B1 * | 2/2006 | Reece | 380/260 |
| 7,047,222 B1 * | 5/2006 | Bush | 705/64 |

FOREIGN PATENT DOCUMENTS

| | | |
|---|---|---|
| JP | 2000-075797 | 3/2000 |
| JP | 3030341 | 10/2000 |
| JP | 11-362203 | 6/2001 |
| WO | WO 99/22484 A1 | 5/1999 |
| WO | WO 01/50676 A1 | 7/2001 |

* cited by examiner

CONVERTER, ENCRYPTION/DECRYPTION SYSTEM, MULTI-STAGE CONVERTER, CONVERTING METHOD, MULTI-STAGE CONVERTING METHOD, PROGRAM, AND INFORMATION RECORDING MEDIUM

BACKGROUND OF THE INVENTION

1. Field of the Invention

The present invention relates to a converter, an encryption/decryption system, a multi-stage converter, a converting method, a multi-stage converting method, a program and an information recording medium recording information, which are preferable for a vector-stream private key encryption system.

2. Description of the Related Art

Conventionally, as a private key encryption system, a block encryption method or a stream encryption method are known. The standard of the block encryption method includes DES, RC5, etc., and the standard of the stream encryption method includes RC4, SEAL 1.0, etc.

According to the stream encryption method, a random bit string is generated, and an exclusive OR operation is applied between target data to be encrypted and this generated random bit string, thereby encrypting the target data. Hence, the encryption speed depends on the generation speed of the random bit string, so that the encryption can be realized generally at high speed. The stream encryption method is preferred for the contents (mobile communications, etc.) wherein bit errors are not negligible, and realizes flexible change in the data format.

In the block encryption method, non-linear mixing of data, i.e. an "S" function, is used. Data processing is performed in the unit of blocks, it is an advantageous aspect that various data formats (image data, audio data, motion pictures, etc.) can be employed in this encryption method. However, if there is a bit error in the data, the error may be diffused.

It is highly demanded that there should be a private key encryption system having both the advantage of the above-described stream encryption technique and the advantage of the block encryption technique.

In particular, demanded is a private key encryption system which is suitable for encrypting a large volume of data, such as large-scale databases, image data, audio data, motion pictures, etc.

SUMMARY OF THE INVENTION

The present invention has been made in consideration of the above. It is accordingly an object of the present invention to provide a converter, an encryption/decryption system, a multi-stage converter, a converting method, a multi-stage converting method, a program and an information recording medium, which are preferable for a vector-stream private key encryption system.

In order to accomplish the above object, according to the first aspect of the present invention, there is provided a converter using:

an "n" ($n \geq 1$) number of conversion functions, $F_i: A \times A \rightarrow A$ ($1 \leq i \leq n$), with respect to a domain A;

a binary arithmetic operation, ☆: $A \times A \rightarrow A$, and its reverse binary arithmetic operation, ⊚: $A \times A \rightarrow A$, wherein, for arbitrary $x \in A$, $y \in A$, conditions of $(x ☆ y) ⊚ y = x$, and $(x ⊚ y) ☆ y = x$ are satisfied; and a predetermined parameter, $a \in A$, and the converter comprising a generating unit, a key accepting unit, a repetition controller, a data accepting unit, and a converting unit, and wherein:

the generating unit accepts generated inputs, $x_1, x_2, \ldots, x_n \in A$, whose length is "n" in total, and generates generated outputs, $y_1, y_2, \ldots, y_n \in A$, whose length is "n" in total using recurrence formulas $y_1 = F_1(x_1, a)$, and $y_{i+1} = F_{i+1}(x_{i+1}, y_i)$ ($1 \leq i \leq n-1$);

the key accepting unit accepts key inputs, $k_1, k_2, \ldots, k_n \in A$, whose length is "n" in total, and gives the accepted key inputs as generated inputs to the generating unit;

the repetition controller gives the generated outputs from the generating unit as generated inputs to the generating unit, for an "m" ($m \geq 0$) number of times, and sets one of the generated outputs to be given at end as a random number string, $r_1, r_2, \ldots, r_n \in A$, whose length is "n" in total;

the data accepting unit accepts data inputs, $d_1, d_2, \ldots, d_n \in A$, whose length is "n" in total; and the converting unit converts data for any integers "i" in a range between 1 and "n" using a formula $e_i = d_i ☆ r_i$, and outputs data outputs, $e_1, e_2, \ldots, e_n \in A$, whose length is "n" in total.

In order to accomplish the above object, according to the second aspect of the present invention, there is provided a converter using:

an "n" ($n \geq 1$) number of conversion functions, $F_i: A \times A \rightarrow A$ ($1 \leq i \leq n$), with respect to a domain A;

a binary arithmetic operation, ☆: $A \times A \rightarrow A$, and its reverse binary arithmetic operation, ⊚: $A \times A \rightarrow A$, wherein, for arbitrary $x \in A$, $y \in A$, conditions of $(x ☆ y) ⊚ y = x$, and $(x ⊚ y) ☆ y = x$ are satisfied; and a predetermined parameter, $a \in A$, and the converter comprising a generating unit, a key accepting unit, a repetition controller, a data accepting unit, and a converting unit, and wherein:

the generating unit accepts generated inputs, $x_1, x_2, \ldots, x_n \in A$, whose length is "n" in total, and generates generated outputs, $y_1, y_2, \ldots, y_n \in A$, whose length is "n" in total using recurrence formulas, $y_1 = F_1(x_1, a)$, and $y_{i+1} = F_{i+1}(x_{i+1}, x_i)$ ($1 \leq i \leq n-1$);

the key accepting unit accepts key inputs, $k_1, k_2, \ldots, k_n \in A$ whose length is "n" in total, and gives the accepted key inputs as generated inputs to the generating unit;

the repetition controller gives the generated outputs from the generating unit as generated inputs to the generating unit, for an "m" ($m \geq 0$) number of times, and sets one of the generated outputs to be given at end as a random number string, $r_1, r_2, \ldots, r_n \in A$, whose length is "n" in total;

the data accepting unit accepts data inputs, $d_1, d_2, \ldots, d_n \in A$, whose length is "n" in total; and the converting unit converts data for any integers "i" in a range between 1 and "n" using a formula $e_i = d_i ☆ r_i$, and outputs data outputs, $e_1, e_2, \ldots, e_n \in A$, whose length is "n" in total.

In the above converter, each of the binary arithmetic operations ⊚ and ☆ may be exclusive OR.

In the above converter, at least one of the conversion functions $F_i$ may define positive integers M, s, and satisfy following conditions, for an arbitrary integer parameter b ($1 \leq b \leq M^s$), $F_i(x,b) = \text{ceil}(xM^s/b)$ ($1 \leq x \leq b$), and $F_i(x,b) = \text{floor}(M^s(x-b)/(M^s-b)) + 1$ ($b < x \leq M^s$), in cases where:
"ceil(•)" represents that decimals should be rounded off to a next whole number in "M" number system; and
"floor(•)" represents that decimals should be cut off in "M" number system.

In the converter, at least one of the conversion functions $F_1$ may define positive integers M, s, and satisfy following conditions, for an arbitrary integer parameter, b ($1 \leq b \leq M^s$), $F_i(y,b) = x_1$ ($q < x_1$);

$F_i(y,b) = x_2$ ($x_1 \leq q$), where $x_1 = \text{floor}(M^{-s}by)$;

$x_2 = \text{ceil}((M^{-s}b-1)y + M^s)$;

$q = b(x_2 - M^s)/(b - M^s)$, in cases where:
"ceil(•)" represents that decimals should be rounded off to a next whole number in "M" number system; and
"floor(•)" represents that decimals should be cut off in "M" number system.

In order to accomplish the above object, according to the third aspect of the present invention, there is provided an encryption/decryption system including the above-described converter as an encrypting unit and another converter having a same structure of a structure of the converter as a decrypting unit, and wherein:

"$F_i$", ⊚, and "a", are commonly used by the encrypting unit and the decrypting unit;

a condition, $x ☆ y = x ⊚ y$, is satisfied for an arbitrary $x \in A$ and $y \in A$;

the encrypting unit and the decrypting unit commonly accepts key inputs, $k_1, k_2, \ldots, k_n$;

the encrypting unit accepts original data whose length is "n", as a data input, and outputs a data output whose length is "n" as encrypted data; and the decrypting unit accepts the encrypted data whose length is "n", as a data input, and outputs a data output whose length is "n" as decrypted data.

In order to accomplish the above object, according to the fourth aspect of the present invention, there is provided a converter using:

an "n" ($n \geq 1$) number of conversion functions $F_i: A \times A \to A$ ($1 \leq i \leq n$) and their reverse conversion functions $G_i: A \times A \to A$, with respect to a domain A, wherein, for arbitrary $x \in A$ and $y \in A$, conditions of $F_i(G_i(x,y),y) = x$, and $G_i(F_i(x,y),y) = x$, are satisfied;

a binary arithmetic operation, ☆: $A^n \to A^n$, and its reverse binary arithmetic operation, ⊚: $A^n \to A^n$, wherein, for arbitrary $z \in A^n$, conditions of ☆(⊚z) = z, and ⊚(☆z) = z are satisfied; and a predetermined parameter, $a \in A$, and the converter comprising a generating unit, a data accepting unit, a repetition controller, and a converting unit, and wherein:

the generating unit accepts generated inputs, $x_1, x_2, \ldots, x_n \in A$, whose length is "n" in total, and generates generated outputs, $y_1, y_2, \ldots, y_n \in A$, whose length is "n" in total using recurrence formulas $y_1 = F_1(x_1, a)$, and $y_{i+1} = F_{i+1}(x_{i+1}, y_i)$ ($1 \leq i \leq n-1$);

the data accepting unit accepts data inputs, $k_1, k_2, \ldots, k_n \in A$, whose length is "n" in total, and gives the accepted data inputs as generated inputs to the generating unit;

the repetition controller gives the generated outputs from the generating unit as generated inputs to the generating unit, for an "m" ($m \geq 0$) number of times, and sets one of the generated outputs to be given at end as a random number string, $r_1, r_2, \ldots, r_n \in A$, whose length is "n" in total; and the converting unit applies a single-term arithmetic operation, ☆, to the random number string, $r_1, r_2, \ldots, r_n \in A$, to perform its data conversion, that is, $(e_1, e_2, \ldots, e_n) = ☆(r_1, r_2, \ldots, r_n)$, and outputs data outputs, $e_1, e_2, \ldots, e_n$, whose length is "n" in total.

In order to accomplish the above object, according to the fifth aspect of the present invention, there is provided a converter using:

an "n" ($n \leq 1$) number of conversion functions, $F_i: A \times A \to A$ ($1 \leq i \leq n$), and their reverse conversion functions, $G_i: A \times A \to A$, with respect to a domain A, wherein, for arbitrary $x \in A$ and $y \in A$, conditions of $F_i(G_i(x,y),y) = x$, and $G_i(F_i(x,y),y) = x$, are satisfied;

a binary arithmetic operation, ☆: $A^n \to A^n$, and its reverse binary arithmetic operation, ⊚: $A^n \to A^n$, wherein, for arbitrary $z \in A^n$, conditions of ☆(⊚z) = z, and ⊚(☆z) = z are satisfied; and a predetermined parameter, $a \in A$, and the converter comprising a generating unit, a data accepting unit, a converting unit, and a repetition controller, and wherein:

the generating unit accepts generated inputs, $x_1, x_2, \ldots, x_n \in A$, whose length is "n" in total, and generates generated outputs, $y_1, y_2, \ldots, y_n \in A$, whose length is "n" in total using recurrence formulas, $y_1 = G_1(x_1, a)$, and $y_{i+1} = G_{i+1}(x_{i+1}, x_i)$ ($1 \leq i \leq n-1$);

the data accepting unit accepts data inputs, $h_1, h_2, \ldots, h_n \in A$, whose length is "n" in total;

the converting unit applies a single-term arithmetic operation, ☆, to the data inputs, $h_1, h_2, \ldots, h_n$, to perform its data conversion, that is, $(v_1, v_2, \ldots, v_n) = \star(h_1, h_2, \ldots, h_n)$, and gives results of the data conversion, $v_1, v_2, \ldots, v_n$, to the generating unit; and the repetition controller gives the generated outputs from the generating unit as generated inputs to the generating unit, for an "m" ($m \geq 0$) number of times, and sets one of the generated outputs to be given at end as data outputs, $s_1, s_2, \ldots, s_n \in A$, whose length is "n" in total.

In the above converter, in cases where "A" represents a "t"-number bit space, and "$z \in A^n$" corresponds to a bit string having "tn" bits in length, in the single-term arithmetic operation ⊚, bits in the bit string may be shifted by a predetermined number of bits in a predetermined direction, and its resultant bit string may be set to correspond to $A^n$, thereby obtaining a result of the single-term arithmetic operation ⊚.

In the converter, at least one of the conversion functions, $F_i$, may define positive integers M, s, and satisfy following conditions, for an arbitrary integer parameter b ($1 \leq b \leq M^s$), $F_i(x, b) = \text{ceil}(xM^s/b)$ ($1 \leq x \leq b$), and $F_i(x, b) = \text{floor}(M^s(x-b)/(M^s-b))+1$ ($b < x \leq M^s$), in cases where:

"ceil(•)" represents that decimals should be rounded off to a next whole number in "M" number system; and "floor(•)" represents that decimals should be cut off in "M" number system.

In the converter, at least one of the conversion functions, $F_i$, may define positive integers M, s, and satisfy following conditions, for an arbitrary integer parameter, b ($1 \leq b \leq M^s$), $F_i(y, b) = x_1$ ($q < x_1$);

$F_i(y, b) = x_2$ ($x_1 \leq q$), where $x_1 = \text{floor}(M^{-s}by)$;

$x_2 = \text{ceil}((M^{-s}b-1)y+M^s)$;

$q = b(x_2-M^s)/(b-M^s)$, in cases where:

"ceil(•)" represents that decimals should be rounded off to a next whole number in "M" number system; and "floor(•)" represents that decimals should be cut off in "M" number system.

In order to accomplish the above object, according to the sixth aspect of the present invention, there is provided as encryption/decryption system including the above-described former converter as an encrypting unit and the above-described latter converter as a decrypting unit, and wherein:

"$F_i$", "$G_i$", "☆", "⊚", and "a", are commonly used by the encrypting unit and the decrypting unit;

the encrypting unit accepts original data as data inputs, $k_1, k_2, \ldots, k_n$, whose length is "n" in total, and outputs data outputs, $e_1, e_2, \ldots, e_n$, whose length is "n" in total as encrypted data; and the decrypting unit accepts the encrypted data whose length is "n" in total, as data inputs, $h_1, h_2, \ldots, h_n$, and outputs data outputs, $s_1, s_2, \ldots, s_n$, whose length is "n" in total as decrypted data.

In order to accomplish the above object, according to the seventh aspect of the present invention, there is provided an encryption/decryption system including the above-described former converter as an encrypting unit and the above-described latter converter as a decrypting unit, and wherein:

"$F_i$", "$G_i$", "☆", "⊚", and "a" are commonly used by the encrypting unit and the decrypting unit;

the encrypting unit accepts original data as data inputs, $h_1, h_2, \ldots, h_n$, whose length is "n" in total, and outputs data outputs, $s_1, s_2, \ldots, s_n$, whose length is "n" in total as encrypted data; and the decrypting unit accepts the encrypted data whose length is "n" in total, as data inputs, $k_1, k_2, \ldots, k_n$, and outputs data outputs, $e_1, e_2, \ldots, e_n$, whose length is "n" in total as decrypted data.

In order to accomplish the above object, according to the eighth aspect of the present invention, there is provided a multi-stage converter comprising:

a "u" number of above-described latter converters (a "j"-th converter is called a converter $M_j$ ($1 \leq j \leq u$)); and a multi-stage key-input accepting unit which accepts parameter inputs $a_1, a_2, \ldots, a_u \in A$, and sets a "j"-th parameter input, $a_j$, included in the accepted parameter inputs, as a predetermined parameter "a" of the converter $M_j$, and wherein a converter $M_1$ included in the "u" number of converters accepts multi-stage conversion inputs, $k_1, k_2, \ldots, k_n$, whose length is "n" in total, as data inputs, data outputs, which are output by a converter $M_i$ ($1 \leq i \leq u-1$) included in the "u" number of converters, are given to a converter $M_{i+1}$ included in the "u" number of converters, as data inputs, and a converter $M_u$ included in the "u" number of converters outputs data outputs, $e_1, e_2, \ldots, e_n$, whose length is "n" in total, as multi-stage conversion outputs.

In order to accomplish the above object, according to the ninth aspect of the present invention, there is provided a multi-stage converter comprising:

a "u" number of above-described latter converters (a "j"-th converter is called a converter $M_j$ ($1 \leq j \leq u$)) according to claim 7; and a multi-stage key-input accepting unit which accepts parameter inputs $a_1, a_2, \ldots, a_u \in A$, and sets a "j"-th parameter input, $a_j$, included in the accepted parameter inputs, as a predetermined parameter "a" of the converter $M_j$, and wherein a converter $M_u$ included in the "u" number of converters accepts multi-stage conversion inputs, $h_1, h_2, \ldots, h_n$, whose length is "n" in total, as data inputs, data outputs, which are output by a converter $M_{i+1}$ ($1 \leq i \leq u-1$) included in the "u" number of converters, are given to a converter $M_i$ included in the "u" number of converters, as data inputs, and a converter $M_1$ included in the "u" number of converters outputs data outputs, $s_1, s_2, \ldots, s_n$, whose length is "n" in total, as multi-stage conversion outputs.

In order to accomplish the above object, according to the tenth aspect of the present invention, there is provided an encryption/decryption system including the above-described former multi-stage converter as an encrypting unit and the above-described latter multi-stage converter as a decrypting unit, and wherein:

"$F_i$", "$G_i$", "☆", and "⊙", are commonly used by the encrypting unit and the decrypting unit;

parameter inputs, $a_1, a_2, \ldots, a_u$, are commonly accepted by the encrypting unit and the decrypting unit;

the encrypting unit accepts original data as multi-stage conversion inputs, $k_1, k_2, \ldots, k_n$, whose length is "n" in total, and outputs multi-stage conversion outputs, $e_1, e_2, \ldots, e_n$, whose length is "n" in total as encrypted data; and the decrypting unit accepts the encrypted data whose length is "n" in total, as multi-stage conversion inputs, $h_1, h_2, \ldots, h_n$, and outputs data outputs, $s_1, s_2, \ldots, s_n$, whose length is "n" in total as decrypted data.

In order to accomplish the above object, according to the eleventh aspect of the present invention, there is provided an encryption/decryption system including the above-described latter multi-stage converter as an encrypting unit and the above-described former multi-stage converter as a decrypting unit, and wherein:

"$F_i$", "$G_i$", "☆", and "⊙", are commonly used by the encrypting unit and the decrypting unit;

parameter inputs, $a_1, a_2, \ldots, a_u$, are commonly accepted by the encrypting unit and the decrypting unit;

the encrypting unit accepts original data as multi-stage conversion inputs, $h_1, h_2, \ldots, h_n$, whose length is "n" in total, and outputs multi-stage conversion outputs, $s_1, s_2, \ldots, s_n$, whose length is "n" in total as encrypted data; and the decrypting unit accepts the encrypted data whose length is "n" in total, as multi-stage conversion inputs, $k_1, k_2, \ldots, k_n$, and outputs data outputs, $e_1, e_2, \ldots, e_n$, whose length is "n" in total as decrypted data.

In order to accomplish the above object, according to the twelfth aspect of the present invention, there is provided a converting method using:

an "n" ($n \geq 1$) number of conversion functions, $F_i: A \times A \to A$ ($1 \leq i \leq n$), with respect to a domain A;

a binary arithmetic operation, ☆: $A \times A \to A$, and its reverse binary arithmetic operation, ⊙: $A \times A \to A$, wherein, for arbitrary $x \in A$, $y \in A$, conditions of $(x ☆ y) ⊙ y = x$, and $(x ⊙ y) ☆ y = x$ are satisfied; and a predetermined parameter, $a \in A$, and the converting method comprising a generating step, a key accepting step, a repetition controlling step, a data accepting step, and a converting step, and wherein:

the generating step includes accepting generated inputs, $x_1, x_2, \ldots, x_n \in A$, whose length is "n" in total, and generating generated outputs, $y_1, y_2, \ldots, y_n \in A$, whose length is "n" in total using recurrence formulas, $y_1 = F_1(x_1, a)$, and $y_{i+1} = F_{i+1}(x_{i+1}, y_i)$ ($1 \leq i \leq n-1$);

the key accepting step includes accepting key inputs, $k_1, k_2, \ldots, k_n \in A$ whose length is "n" in total, and giving the accepted key inputs as generated inputs to the generating step;

the repetition controlling step includes giving the generated outputs from the generating step as generated inputs to the generating step, for an "m" ($m \geq 0$) number of times, and setting one of the generated outputs to be given at end as a random number string, $r_1, r_2, \ldots, r_n \in A$, whose length is "n" in total;

the data accepting step includes accepting data inputs, $d_1, d_2, \ldots, d_n \in A$, whose length is "n" in total; and the converting step includes converting data for any integers "i" in a range between 1 and "n" using a formula, $e_i = d_i ☆ r_i$, and outputting data outputs, $e_1, e_2, \ldots, e_n \in A$, whose length is "n" in total.

In order to accomplish the above object, according to the thirteenth aspect of the present invention, there is provided a converting method using:

an "n" ($n \geq 1$) number of conversion functions, $F_i: A \times A \to A$ ($1 \leq i \leq n$), with respect to a domain A;

a binary arithmetic operation, ☆: $A \times A \to A$, and its reverse binary arithmetic operation, ⊙: $A \times A \to A$, wherein, for arbitrary $x \in A$, $y \in A$, conditions of $(x ☆ y) ⊙ y = x$, and $(x ⊙ y) ☆ y = x$ are satisfied; and a predetermined parameter, $a \in A$, and the converting method comprising a generating step, a key accepting step, a repetition controlling step, a data accepting step, and a converting step, and wherein:

the generating step includes accepting generated inputs, $x_1, x_2, \ldots, x_n \in A$, whose length is "n" in total, and generating generated outputs, $y_1, y_2, \ldots, y_n \in A$, whose length is "n" in total using recurrence formulas, $y_1 = F_1(x_1, a)$, and $y_{i+1} = F_{i+1}(x_{i+1}, x_i)$ ($1 \leq i \leq n-1$);

the key accepting step includes accepting key inputs, $k_1, k_2, \ldots, k_n \in A$ whose length is "n" in total, and giving the accepted key inputs as generated inputs to the generating step;

the repetition controlling step includes giving the generated outputs from the generating step as generated inputs to the generating step, for an "m" ($m \geq 0$) number of times, and setting one of the generated outputs to be given at end as a random number string, $r_1, r_2, \ldots, r_n \in A$, whose length is "n" in total;

the data accepting step includes accepting data inputs, $d_1, d_2, \ldots, d_n \in A$, whose length is "n" in total; and the converting step includes converting data for any integers "i" in a range between 1 and "n" using a formula $e_i = d_i ☆ r_i$, and outputting data outputs, $e_1, e_2, \ldots, e_n \in A$, whose length is "n" in total.

Each of the binary arithmetic operations ⊙ and ☆ may be exclusive OR.

In the converting method, at least one of the conversion functions $F_i$ may define positive integers M, s, and satisfy following conditions, for an arbitrary integer parameter b ($1 \leq b \leq M^s$), $F_i(x, b) = \text{ceil}(xM^s/b)$ ($1 \leq x \leq b$), and $F_i(x, b) = \text{floor}(M^s(x-b)/(M^s-b)) + 1$ ($b < x \leq M^s$), in cases where:

"ceil(•)" represents that decimals should be rounded off to a next whole number in "M" number system; and "floor(•)" represents that decimals should be cut off in "M" number system.

In the converting method,
at least one of the conversion functions $F_i$ may define positive integers M, s, and satisfy following conditions, for an arbitrary integer parameter, b ($1 \leq b \leq M^s$), $$F_i(y,b) = x_1 \ (q < x_1);$$

$$F_i(y,b) = x_2 \ (x_1 \leq q);$$

where $$x_1 = \text{floor}(M^{-s}by);$$

$$x_2 = \text{ceil}((M^{-s}b - 1)y + M^s);$$

$$q = b(x_2 - M^s)/(b - M^s),$$

in cases where:
"ceil(•)" represents that decimals should be rounded off to a next whole number in "M" number system; and
"floor(•)" represents that decimals should be cut off in "M" number system.

In order to accomplish the above object, according to the fourteenth aspect of the present invention, there is provided a converting method using:
an "n" ($n \geq 1$) number of conversion functions, $F_i$: $A \times A \rightarrow A$, ($1 \leq i \leq n$) and their reverse conversion functions, $G_i$: $A \times A \rightarrow A$, with respect to a domain A, wherein, for arbitrary $x \in A$ and $y \in A$, conditions of $$F_i(G_i(x,y),y) = x, \text{ and}$$

$$G_i(F_i(x,y),y) = x,$$

are satisfied;
a binary arithmetic operation, ☆: $A^n \rightarrow A^n$, and its reverse binary arithmetic operation, ◎: $A^n \rightarrow A^n$, wherein, for arbitrary $z \in A^n$, conditions of $$☆(◎z) = z, \text{ and}$$

$$◎(☆z) = z$$

are satisfied; and
a predetermined parameter, $a \in A$, and
the converting method comprising a generating step, a data accepting step, a repetition controlling step, and a converting step, and wherein:
the generating step includes accepting generated inputs, $x_1, x_2, \ldots, x_n \in A$, whose length is "n" in total, and generating generated outputs, $y_1, y_2, \ldots, y_n \in A$, whose length is "n" in total using recurrence formulas, $$y_1 = F_1(x_1, a), \text{ and}$$

$$y_{i+1} = F_{i+1}(x_{i+1}, y_i) \ (1 \leq i \leq n-1);$$

the data accepting step includes accepting data inputs, $k_1, k_2, \ldots, k_n \in A$, whose length is "n" in total, and giving the accepted data inputs as generated inputs to the generating step;
the repetition controlling step includes giving the generated outputs from the generating step as generated inputs to the generating step, for an "m" ($m \geq 0$) number of times, and setting one of the generated outputs to be given at end as a random number string, $r_1, r_2, \ldots, r_n \in A$, whose length is "n" in total; and
the converting step includes applying a single-term arithmetic operation, ☆, to the random number string, $r_1, r_2, \ldots, r_n \in A$, to perform its data conversion, that is, $$(e_1, e_2, \ldots, e_n) = ☆(r_1, r_2, \ldots, r_n), \text{ and}$$

outputting data outputs, $e_1, e_2, \ldots, e_n$, whose length is "n" in total.

In order to accomplish the above object, according to the fifteenth aspect of the present invention, there is provided a converting method using:
an "n" ($n \geq 1$) number of conversion functions, $F_i$: $A \times A \rightarrow A$ ($1 \leq i \leq n$), and their reverse conversion functions, $G_i$: $A \times A \rightarrow A$, with respect to a domain A, wherein, for arbitrary $x \in A$ and $y \in A$, conditions of $$F_i(G_i(x,y),y) = x, \text{ and}$$

$$G_i(F_i(x,y),y) = x,$$

are satisfied;
a binary arithmetic operation, ☆: $A^n \rightarrow A^n$, and its reverse binary arithmetic operation, ◎: $A^n \rightarrow A^n$, wherein, for arbitrary $z \in A^n$, conditions of $$☆(◎z) = z, \text{ and}$$

$$◎(☆z) = z$$

are satisfied; and
a predetermined parameter, $a \in A$, and
the converting method comprising a generating step, a data accepting step, a converting step, and a repetition controlling step, and wherein:
the generating step includes accepting generated inputs, $x_1, x_2, \ldots, x_n \in A$, whose length is "n" in total, and generating generated outputs, $y_1, y_2, \ldots, y_n \in A$, whose length is "n" in total using recurrence formulas, $$y_1 = G_1(x_1, a), \text{ and}$$

$$y_{i+1} = G_{i+1}(x_{i+1}, x_i) \ (1 \leq i \leq n-1);$$

the data accepting step includes accepting data inputs, $h_1, h_2, \ldots, h_n \in A$, whose length is "n" in total;
the converting step includes applying a single-term arithmetic operation, ☆, to the data inputs, $h_1, h_2, \ldots, h_n$, to perform its data conversion, that is, $$(v_1, v_2, \ldots, v_n) = ☆(h_1, h_2, \ldots, h_n), \text{ and}$$

giving results of the data conversion, $v_1, v_2, \ldots, v_n$, to the generating step; and
the repetition controlling step includes giving the generated outputs from the generating step as generated inputs to the generating step, for an "m" ($m \geq 0$) number of times, and setting one of the generated outputs to be given at end as data outputs, $s_1, s_2, \ldots, s_n \in A$, whose length is "n" in total.

In the above-described converting method, in cases where "A" represents a "t"-number bit space, and "$z \in A^n$" corresponds to a bit string having "tn" bits in length, in the single-term arithmetic operation ◎, bits in the bit string may be shifted by a predetermined number of bits in a predetermined direction, and its resultant bit string may be set to correspond to $A^n$, thereby obtaining a result of the single-term arithmetic operation ◎.

In the converting method,
at least one of the conversion functions $F_i$ may define positive integers M, s, and satisfy following conditions, for an arbitrary integer parameter b ($1 \leq b \leq M^s$), $$F_i(x,b) = \text{ceil}(xM^s/b) \ (1 \leq x \leq b), \text{ and}$$

$$F_i(x,b) = \text{floor}(M^s(x-b)/(M^s-b)) + 1 \ (b < x \leq M^s),$$

in cases where:
"ceil(•)" represents that decimals should be rounded off to a next whole number in "M" number system; and "floor(•)" represents that decimals should be cut off in "M" number system.

In the converting method,
at least one of the conversion functions $F_i$ may define positive integers M, s, and satisfy following conditions, for an arbitrary integer parameter, b ($1 \leq b \leq M^s$), $F_i(y,b) = x_1$ ($q < x_1$);

$F_i(y,b) = x_2$ ($x_1 \leq q$), where $x_1 = \text{floor}(M^{-s}by)$;

$x_2 = \text{ceil}((M^{-s}b-1)y + M^s)$;

$q = b(x_2 - M^s)/(b - M^s)$, in cases where:
"ceil(•)" represents that decimals should be rounded off to a next whole number in "M" number system; and
"floor(•)" represents that decimals should be cut off in "M" number system.

In order to accomplish the above object, according to the sixteenth aspect of the present invention, there is provided a multi-stage converting method comprising:

a "u" number of converting steps (a "j"-th converting step is called a converting step $M_j$ ($1 \leq j \leq u$)) of using the converting method according to claim 23; and a multi-stage key-input accepting step of accepting parameter inputs $a_1, a_2, \ldots, a_u \in A$ whose length is "n" in total, and setting a "j"-th parameter input, $a_j$, included in the accepted parameter inputs, as a predetermined parameter "a" of the converting step $M_j$, and wherein a converting step $M_1$ included in the "u" number of converting steps includes accepting multi-stage conversion inputs, $k_1, k_2, \ldots, k_n$, whose length is "n" in total, as data inputs, data outputs, which are output at a converting step $M_i$ ($1 \leq i \leq u-1$) included in the "u" number of converting steps, are given to a converting step $M_{i+1}$ included in the "u" number of converting steps, as data inputs, and a converting step $M_u$ included in the "u" number of converting steps includes outputting data outputs, $e_1$, $e_2, \ldots, e_n$, whose length is "n" in total, as multi-stage conversion outputs.

In order to accomplish the above object, according to the seventeenth aspect of the present invention, there is provided a multi-stage converting method comprising:

a "u" number of converting steps (a "j"-th converting step is called a converting step $M_j$ ($1 \leq j \leq u$)) of using the converting method according to claim 24; and a multi-stage key-input accepting step of accepting parameter inputs $a_1, a_2, \ldots, a_u \in A$ whose length is "n" in total, and setting a "j"-th parameter input, $a_j$ included in the accepted parameter inputs, as a predetermined parameter "a" of the converting step $M_j$, and wherein a converting step $M_u$ included in the "u" number of converting steps includes accepting multi-stage conversion inputs, $h_1, h_2, \ldots, h_n$, whose length is "n" in total, as data inputs, data outputs, which are output at a converting step $M_{i+1}$ ($1 \leq i \leq u-1$) included in the "u" number of converting steps, are given to a converting step. $M_i$ included in the "u" number of converting steps, as data inputs, and a converting step $M_1$ included in the "u" number of converting steps includes outputting data outputs, $s_1$, $s_2, \ldots, s_n$, whose length is "n" in total, as multi-stage conversion outputs.

In order to accomplish the above object, according to the eighteenth aspect of the present invention, there is provided a program for controlling a computer to serve as any of the above-described converters or any of the above-described multi-stage converters, or a program for controlling a computer to execute any of the above-described converting methods or any of the above-described multi-stage converting methods.

In order to accomplish the above object, according to the nineteenth aspect of the present invention, there is provided an information recording medium recording any of the programs.

As the above-described information recording medium, there may be employed a compact disk, a flexible disk, a hard disk, a magneto-optical disk, a digital video disk, a magnetic tape, and a semiconductor memory.

Separately from the computer to be executing the program, the program of the present invention may be distributed or sold through a computer communication network. In addition, separately from the computer to be executing the program, the information recording medium of the present invention may be distributed or sold through general business transactions, etc.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

Figure 1:
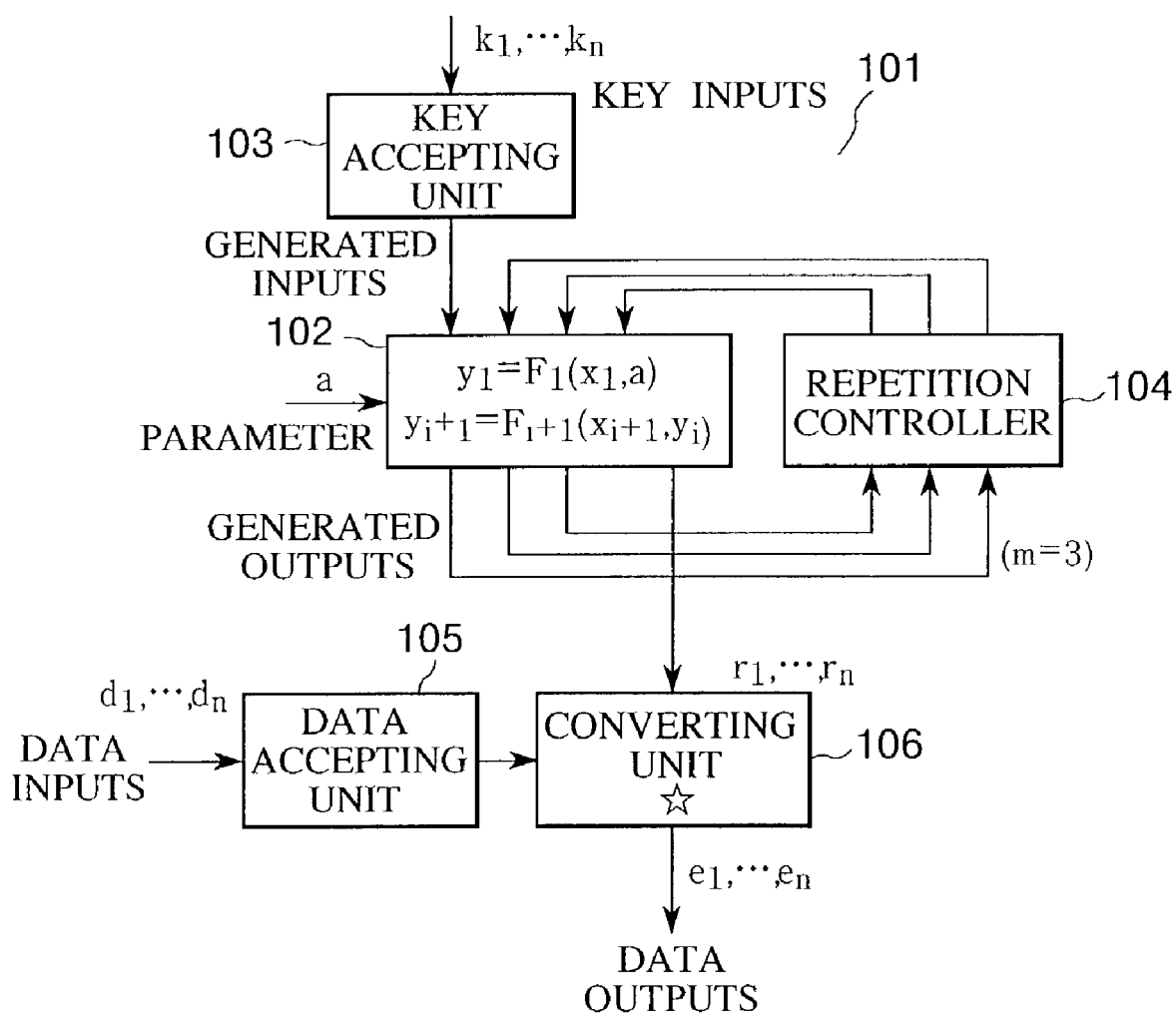
FIG. 1 is an exemplary diagram showing the schematic structure of a converter according to the first embodiment of the present invention.

Preferred embodiments for practicing the present invention will now be described. Embodiments, as will be explained later, are to illustrate the present invention, not to limit the scope of the present invention. For those skilled in the art, the present invention may be applicable to embodiments including replaced elements equivalent to each or entire elements of the present invention, and such embodiments are, therefore, within the scope of the present invention.

In the explanations below, a converter which can be adopted for an encryption system using a vector-stream private (secret) key will be described in each of the first and second embodiments of the present invention, and an encryption/decryption system using either encryption system of the first and second embodiments will be described in the third embodiment of the present invention.

In the preferred embodiments of the present invention, with respect to a domain A, there are an "n" ($n \geq 1$) number of conversion function(s) $F_i$: $A \times A \to A$ ($1 \leq i \leq n$), a binary arithmetic operation ☆: $A \times A \to A$, and its reverse binary arithmetic operation ⊚: $A \times A \to A$. In this case, for arbitrary $x \in A$ and $y \in A$, the conditions of: $(x \star y) \odot y = x$; and $(x \odot y) \star y = x$ should be satisfied.

As such binary arithmetic operations ⊚ and ☆, exclusive OR will be employed in the following embodiments.

In the following explanations, "ceil(•)" represents that decimals should be rounded off to the next whole number in "M" number system, and "floor(•)" represents that decimals should be cut off in "M" number system.

In the following embodiments, at least one of conversion functions $F_i$ defined by positive integers M, s, and should satisfy the following conditions of:

$$F_i(x,b) = \text{ceil}(xM^s/b) \ (1 \leq x \leq b);$$

$$F_i(x,b) = \text{floor}(M^s(x-b)/(M^s-b)) + 1 \ (b < x \leq M^s),$$

for an arbitrary integer parameter b ($1 \leq b \leq M^s$). This conversion function corresponds to Masuda-Aihara mapping with a parameter (IEICE Trans. on Communication, 1999, July, Vol. J82-A, No. 7, pp. 1042-1046). This mapping is called also a skew tent mapping.

In the following embodiments, instead of the above-described conversion functions $F_i$, there can be employed a function (reverse mapping of the above-described Masuda-Aihara mapping with a parameter) which is defined by positive integers M, s, and satisfies, for an arbitrary integer parameter b ($1 \leq b \leq M^s$), the following conditions of:

$$F_i(y,b) = x_1 \ (q < x_1);$$

$$F_i(y,b) = x_2 \ (x_1 \leq q),$$

where $$x_1 = \text{floor}(M^{-s}by);$$

$$x_2 = \text{ceil}((M^{-s}b-1)y + M^s);$$

$$q = b(x_2 - M^s)/(b - M^s).$$

And in the following embodiments, instead of the above-described conversion functions $F_i$, there can be employed a function which is defined by positive integers M, s, is a second degree polynomial in x over module $M^s$, and satisfies, for an arbitrary integer parameter b ($1 \leq b \leq M^s$) and a predefined function g of b, the following conditions of:

$$F_i(x,b) = 2x(x + g(b)) \bmod M^s.$$

First Embodiment

FIG. 1 is an exemplary diagram showing the schematic structure of a converter according to the first embodiment of the present invention.

A converter 101 uses a predetermined parameter $a \in A$. The converter 101 includes a generating unit 102, a key accepting unit 103, a repetition controller 104, a data accepting unit 105, a converting unit 106.

The generating unit 102 receives generated inputs, $x_1, x_2, \ldots, x_n \in A$, whose length is "n" in total, and generates generated outputs, $y_1, y_2, \ldots, y_n \in A$, whose length is "n" in total, using the following recurrence formulas:

$$y_1 = F_1(x_1, a);$$

$$y_{i+1} = F_{i+1}(x_{i+1}, y_i) \ (1 \leq i \leq n-1).$$

The key accepting unit 103 accepts key inputs, $k_1, k_2, \ldots, k_n \in A$, whose length is "n", and gives the generating unit 102 the accepted key inputs.

The repetition controller 104 gives back the generating unit 102 the generated outputs from the generating unit 102 as generated inputs, repeatedly for an "m" ($m \geq 0$) number of times. In this case, the generated outputs to be given at the end is a random number string, $r_1, r_2, \ldots, r_n \in A$, whose length is "n" in total.

The data accepting unit 105 accepts data inputs, $d_1, d_2, \ldots, d_n \in A$, whose length is "n" in total.

The converting unit 106 performs data conversion for any integer(s) "i" in a range between 1 and "n", using the formula $$e_i = d_i \star r_i,$$

so as to output data outputs, $e_1, e_2, \ldots, e_n \in A$, whose length is "n" in total.

This calculation (data conversion) can be executed at high speed by a parallel computer having a pipeline process function. However, in the following explanations, the above calculation is to be executed by a generally-used serial computer.

Figure 2:
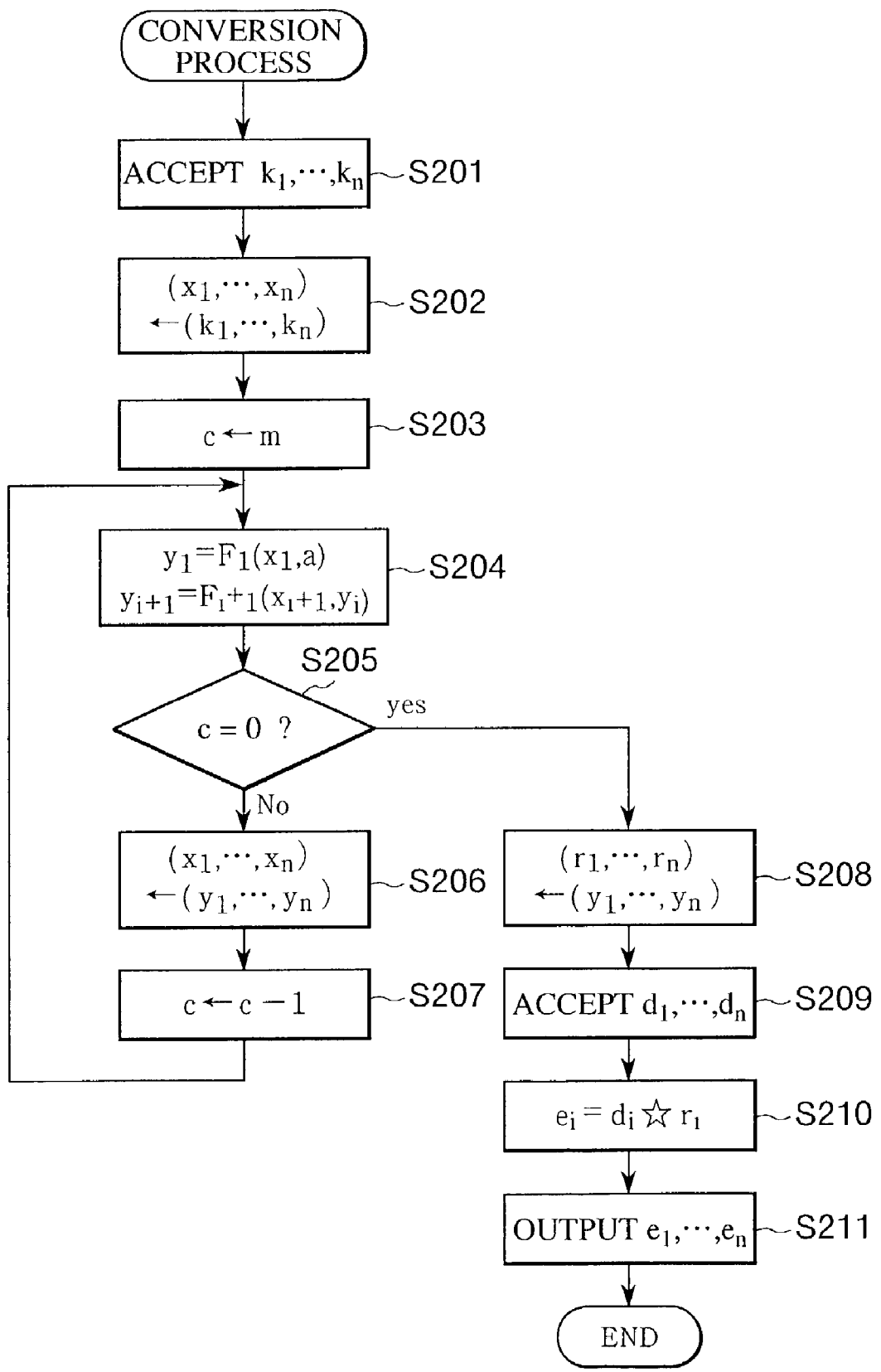
FIG. 2 is a flowchart showing procedures of a conversion process which is carried out by a serial computer serving as the converter.

FIG. 2 is a flowchart for explaining a conversion process which is carried out by a serial computer serving as the converter 101.

The converter 101 accepts key input variables, $k_1, k_2, \ldots, k_n \in A$ (Step S201).

The converter 101 substitutes the accepted variables respectively for variables $x_1, x_2, \ldots, x_n \in A$ (Step S202).

After this, the converter 101 substitutes a value "m" for a counter variable "c" (Step S203).

Further, the converter 101 calculates variables, $y_1, y_2, \ldots, y_n \in A$ (Step S204), using the following recurrence formulas:

$$y_1 = F_1(x_1, a);$$

$$y_{i+1} = F_{i+1}(x_{i+1}, y_i) \ (1 \leq i \leq n-1).$$

The converter 101 checks whether the counter variable "c" is 0 (Step S205). In the case where it is determined that the counter variable "c" is not 0 (Step S205; No), the converter 101 substitutes the variables, $y_1, y_2, \ldots, y_n$ for the variables $x_1, x_2, \ldots, x_n$ (Step S206). After this, the converter 101 decrements the counter variable "c" by 1 (Step S207), and the flow returns to the procedure of the step S204.

In the case where it is determined that the counter variable "c" is 0 (Step S205; Yes), the converter 101 substitutes the variables, $y_1, y_2, \ldots, y_n$ for variables $r_1, r_2, \ldots, r_n \in A$ (Step S208).

The converter 101 accepts target data inputs, $d_1, d_2, \ldots, d_n \in A$ to be encrypted (Step S209).

The converter 101 performs data conversion for any integer(s) "i" in a range between 1 and "n", using the formula $$e_i = d_i \star r_i \ (\text{Step S210}).$$

Finally, the converter 101 outputs variables, $e_1, e_2, \ldots, e_n$ (Step S211).

By the above-described processes, the conversion process to be adopted in the encryption/decryption system of the present invention will be realized.

Second Embodiment

Figure 3:
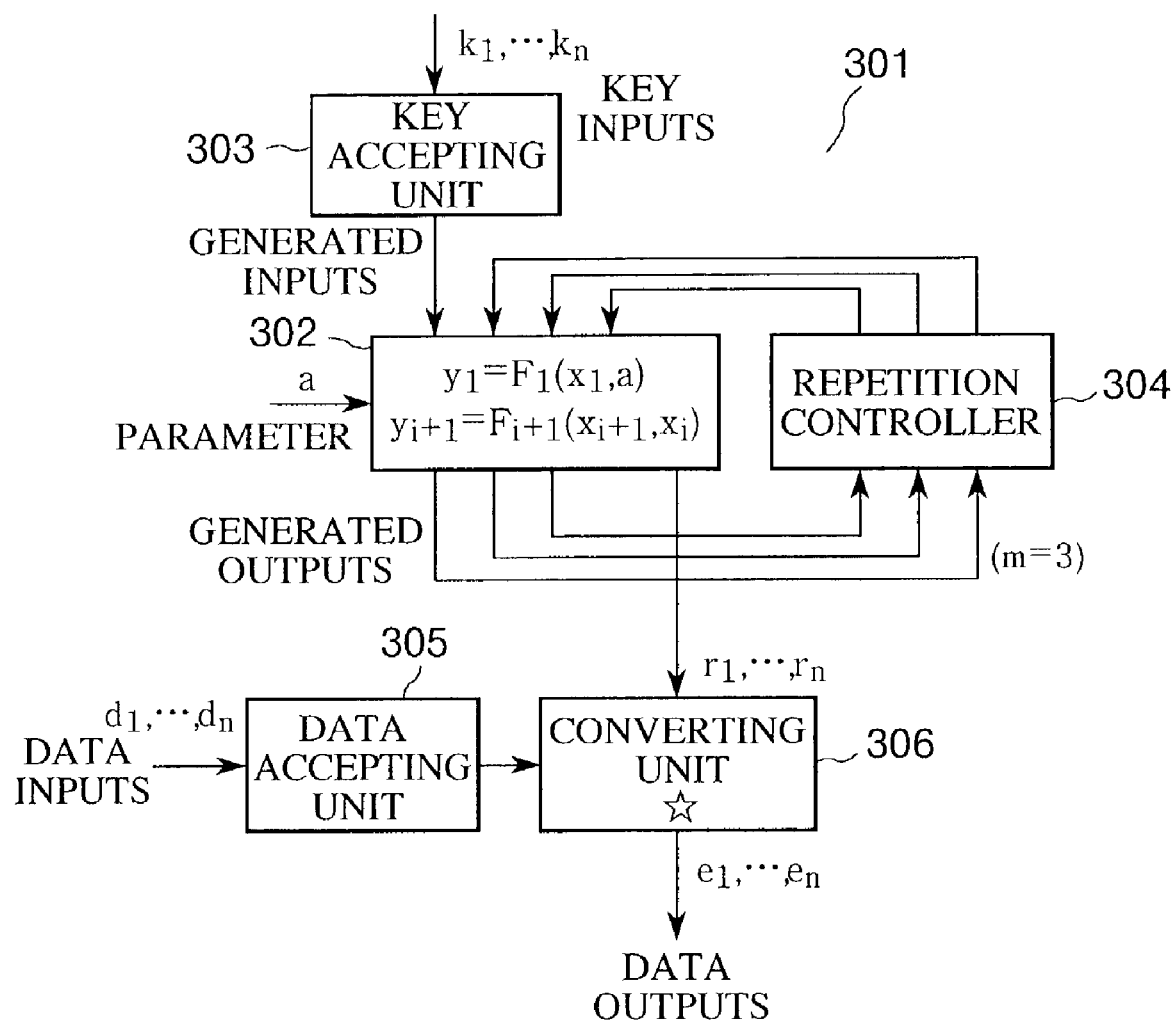
FIG. 3 is an exemplary diagram showing the schematic structure of a converter according to the second embodiment of the present invention.

FIG. 3 is an exemplary diagram showing the schematic structure of a converter according to the second embodiment of the present invention. The converter according to this embodiment will now specifically be explained with reference to FIG. 3.

A converter 301 has the structure which is substantially the same as the structure of the converter 101. The converter 301 has a generating unit 302 corresponding to the generating unit 102, a key accepting unit 303 corresponding to the key accepting unit 103, a repetition controller 304 corresponding to the repetition controller 104, a data accepting unit 305 corresponding to the data accepting unit 105, and a converting unit 306 corresponding to the converting unit 106.

The generating unit 302 uses recurrence formulas which are different from the recurrence formulas used by the generating unit 102. Specifically, the generating unit 302 uses recurrence formulas:

$$y_1 = F_1(x_1, a);$$

$$y_{i+1} = F_{i+1}(x_{i+1}, x_i) \ (1 \leq i \leq n-1).$$

Figure 4:
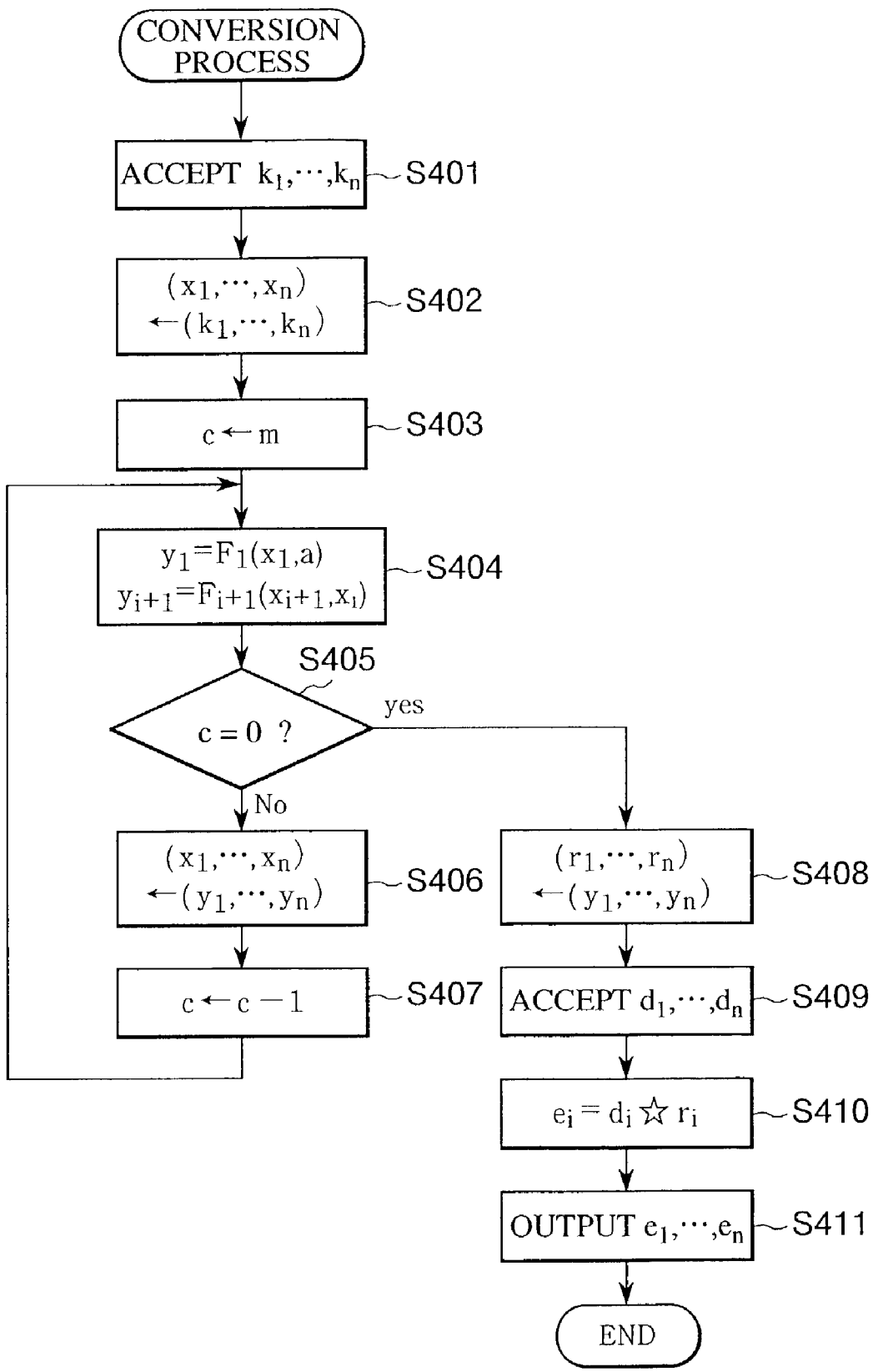
FIG. 4 is a flowchart showing procedures of a conversion process which is carried out by a serial computer serving as the converter of FIG. 3.

FIG. 4 is a flowchart for explaining a conversion process which is carried out by a serial computer serving as the converter 301. The procedures of the conversion process which are performed by the converter 301 are substantially the same as those of conversion process performed by the converter 101, and the procedures of the steps S401 to S411 to be executed by the converter 301 respectively correspond to the procedures of the steps S201 to S211 to be executed by the converter 101.

The recurrence formulas used in the step S404 differ from the recurrence formulas used in the step S204. That is, in the step S404, the converter 301 uses the recurrence formulas:

$$y_1 = F_1(x_1, a);$$

$$y_{i+1} = F_{i+1}(x_{i+1}, x_i) \ (1 \leq i \leq n-1).$$

Third Embodiment

An encryption/decryption system according to the third embodiment of the present invention includes either the converter 101 or the converter 301 as an encrypting unit, and further includes the same as a decrypting unit.

Figure 5:
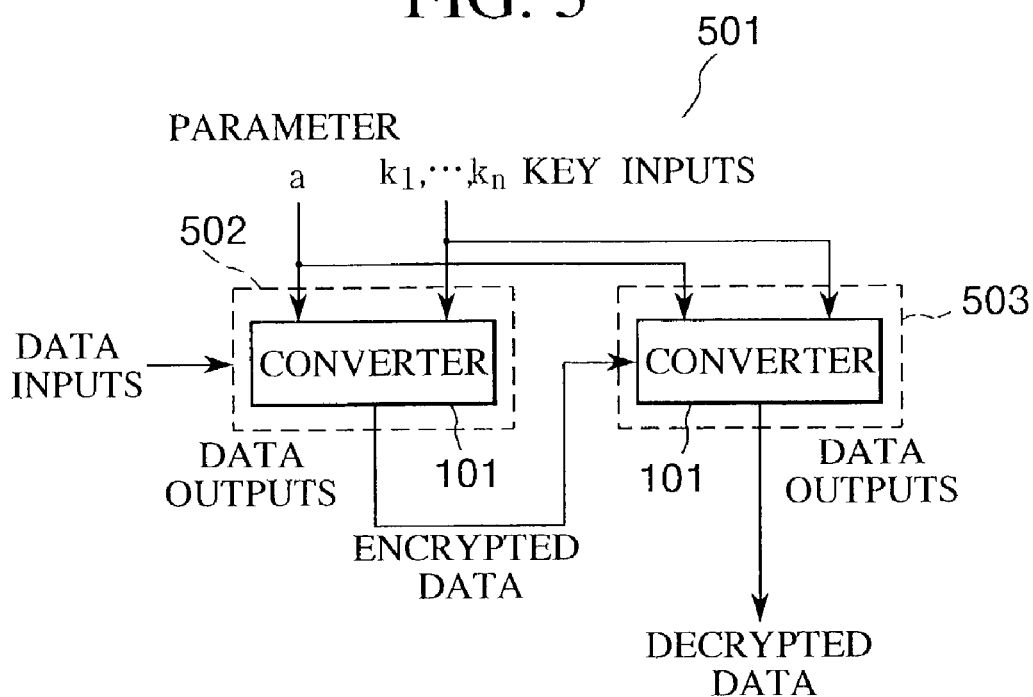
FIG. 5 is an exemplary diagram showing the schematic structure of an encryption/decryption system including the converters respectively as an encrypting unit and a decrypting unit.

FIG. 5 is an exemplary diagram showing the schematic structure of the encryption/decryption system including two converters 101 serving as the encrypting unit and a decrypting unit.

An encryption/decryption system 501 includes an encrypting unit 502 and a decrypting unit 503. Each of the encrypting unit 502 and the decrypting unit 503 includes the converter 101.

The encrypting unit 502 and the decrypting unit 503 use the same "$F_i$" and "a". In this embodiment, the symbols ⊚ and ☆ express the function of exclusive OR, so that a condition of $x \star y = x \odot y$ should be satisfied, for arbitrary $x \in A$, $y \in A$.

Each of the encrypting unit 502 and the decrypting unit 503 accepts the common key inputs, $k_1, k_2, \ldots, k_n$.

The encrypting unit 502 accepts original data whose length is "n" in total, as data inputs, and outputs data outputs whose length is "n" in total, as encrypted data.

The decrypting unit 503 accepts the encoded data, whose length is "n" in length, as data inputs, and outputs data outputs, whose length is "n" in total, as decoded data.

In this manner, a vector-stream private key encryption system can thus be realized.

Figure 6:
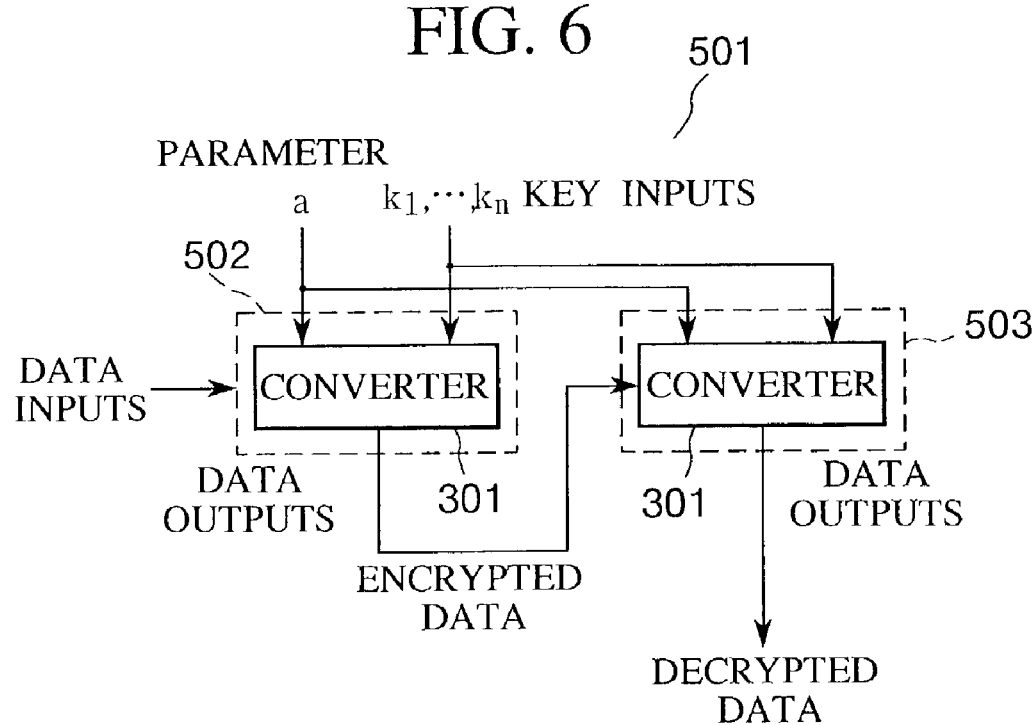
FIG. 6 is an exemplary diagram showing the schematic structure of an encryption/decryption system including the converters respectively as an encrypting unit and a decrypting unit.

FIG. 6 is an exemplary diagram showing the schematic structure of an encryption/decryption system including two converters 301 which serve as an encrypting unit and a decrypting unit. In this embodiment also, the encryption/decryption system 501 includes the encrypting unit 502 and the decrypting unit 503. Except that the each of the encrypting unit 502 and the decrypting unit 503 includes the converter 301, the encryption/decryption system 501 has the same structure as that of FIG. 5.

According to this embodiment also, a vector-stream private key encryption system can be realized.

In the explanations below, a converter which can be adopted for a vector-stream private key encryption system will be described in each of the fourth and fifth embodiments of the present invention, and an encryption/decryption system using either encryption system of the fourth and fifth embodiments will be described in the sixth embodiment of the present invention.

In the explanations below, there are employed an "n" ($1 \leq n$) number of conversion functions $F_i: A \times A \to A$ ($1 \leq i \leq n$) and their reverse conversion functions $G_i: A \times A \to A$, for a domain A. For arbitrary $x \in A$, $y \in A$, the conditions of:

$$F_i(G_i(x,y), y) = x;$$

$$G_i(F_i(x,y), y) = x$$

should be satisfied.

A single-term arithmetic operation ☆: $A^n \to A^n$ and its reverse single-term arithmetic operation ⊚: $A^n \to A^n$ are adopted below. In terms of these arithmetic operations, for arbitrary $z \in A^n$, the following conditions of:

$$\star(\odot z) = z;$$

$$\odot(\star z) = z$$

should be satisfied.

Particularly, in the following explanations, in the case where "A" represents a "t"-number bit space and "$z \in A^n$" corresponds to a bit string having "tn" bits in length, in the single-term arithmetic operation ⊚, bits in the bit string are cyclically shifted by a predetermined number of bits in a predetermined direction. After this, the resultant bit string is set to correspond to $A''$, thereby obtaining a result of the single-term arithmetic operation.

In the following description, "ceil(•)" represents that decimals should be rounded off to the next whole number in "M" number system, and "floor(•)" represents that decimals should be cut off in "M" number system.

In the following embodiments, at least one of conversion functions $F_i$ defined by positive integers M, s, and should satisfy the following conditions of:

$$F_i(x,b) = \text{ceil}(xM^s/b) \quad (1 \leq x \leq b);$$

$$F_i(x,b) = \text{floor}(M^s(x-b)/(M^s-b))+1 \quad (b < x \leq M^s),$$

for an arbitrary integer parameter b ($1 \leq b \leq M^s$). This at least one conversion function corresponds to the above-described Masuda-Aihara mapping with a parameter.

In the following embodiments, instead of the above-described conversion functions $F_i$, there can be employed a function (reverse mapping of the above-described Masuda-Aihara mapping with a parameter) which is defined by positive integers M, s, and satisfies, for an arbitrary integer parameter b ($1 \leq b \leq M^s$), the following conditions of:

$$F_i(y,b) = x_1 \quad (q < x_1);$$

$$F_i(y,b) = x_2 \quad (x_1 \leq q),$$

where $$x_1 = \text{floor}(M^{-s}by);$$

$$x_2 = \text{ceil}((M^{-s}b-1)y+M^s);$$

$$q = b(x_2 - M^s)/(b - M^s).$$

Fourth Embodiment

Figure 7:
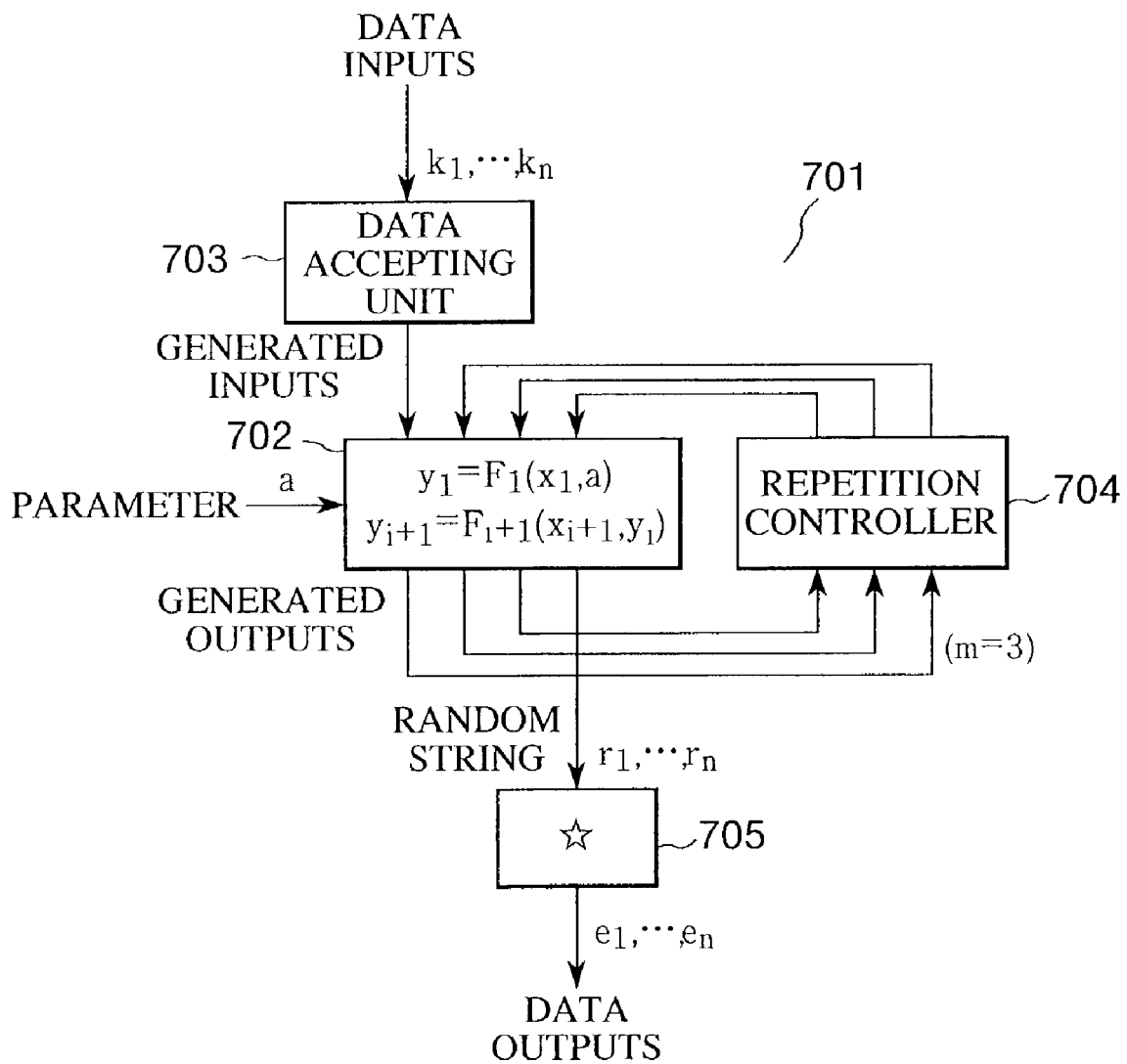
FIG. 7 is an exemplary diagram showing the schematic structure of a converter according to the fourth embodiment of the present invention.

FIG. 7 is an exemplary diagram showing the schematic structure of a converter according to the fourth embodiment of the present invention.

A converter 701 uses a predetermined parameter a∈A. The converter 701 includes a generating unit 702, a data accepting unit 703, a repetition controller 704, and a converter 705.

The generating unit 702 accepts generated inputs, $x_1$, $x_2$, ..., $x_n$∈A, whose length is "n" in total, and outputs generated outputs, $y_1$, $y_2$, ..., $y_n$∈A, whose length is "n" in total, using the following recurrence formulas:

$$y_1 = F_1(x_1, a);$$

$$y_{i+1} = F^{i+1}(x_{i+1}, y_i) \quad (1 \leq i \leq n-1).$$

The data accepting unit 703 accepts data inputs, $k_1$, $k_2$, ..., $k_n$∈A, whose length is "n" in total, and gives the accepted data inputs to the generating unit 702.

The repetition controller 704 gives back the generating unit 702 the generated outputs sent from the generating unit 102 as generated inputs, repeatedly for an "m" (m≧0) number of times. In this case, the generated output to be given at the end is a random number string, $r_1$, $r_2$, ..., $r_n$∈A, whose length is "n" in total.

The converting unit 705 applies a single-term arithmetic operation ☆ to the random number string, $r_1$, $r_2$, ..., $r_n$∈A, to perform its data conversion, that is, $$(e_1, e_2, \ldots, e_n) = \text{☆}(r_1, r_2, \ldots, r_n),$$

so as to output data outputs, $e_1$, $e_2$, ..., $e_n$, whose length is "n" in total.

The arithmetic operation can be accomplished at high speed by a parallel computer having a pipeline process function, and can be accomplished also by a general serial computer.

Figure 8:
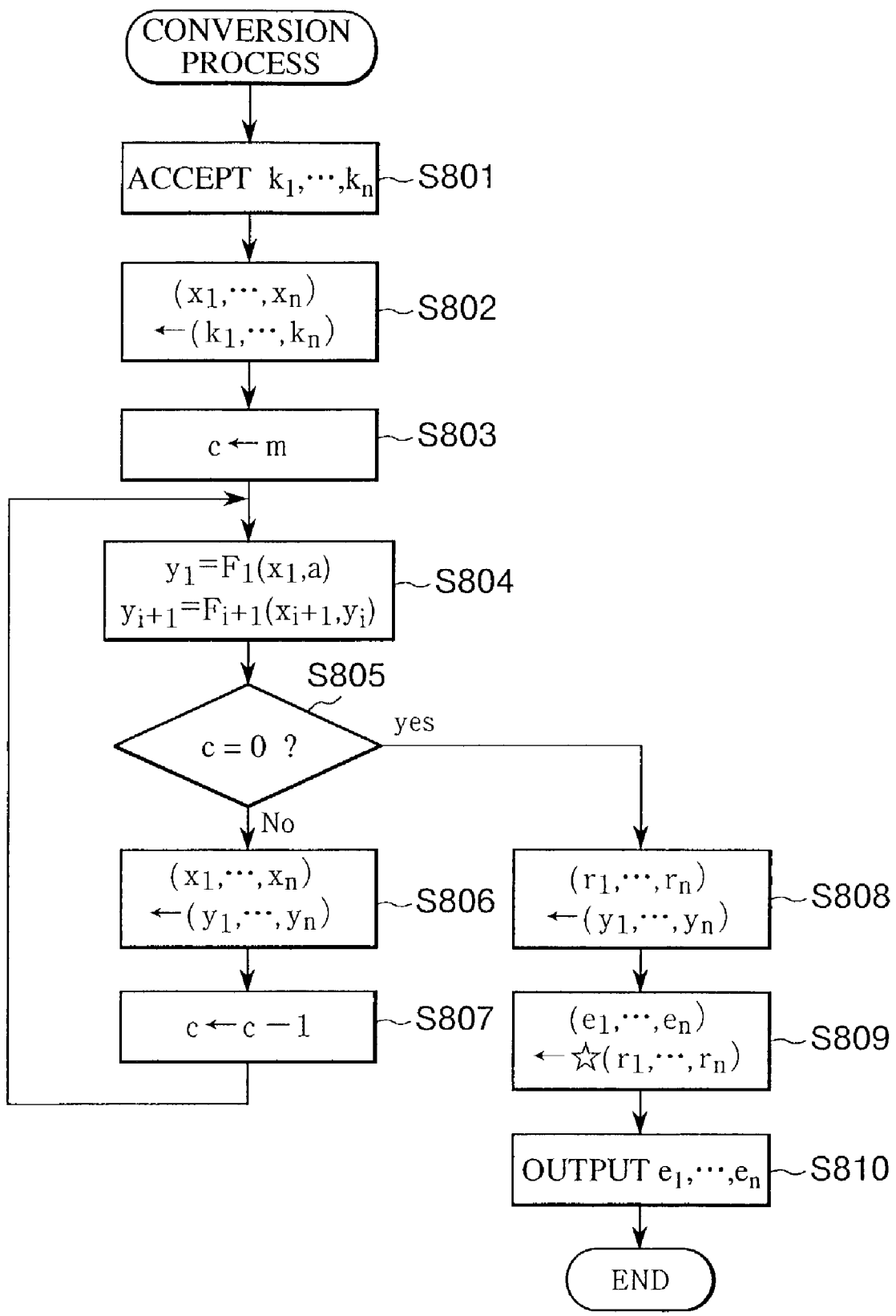
FIG. 8 is a flowchart showing procedures of a conversion process which is carried out by a serial computer serving as the converter of FIG. 7.

FIG. 8 is a flowchart for explaining a conversion process which is carried out by a serial computer serving as the converter 701.

The converter 701 accepts data inputs, $k_1$, $k_2$, ..., $k_n$∈A, whose length is "n" in total (Step S801).

The converter 701 substitutes the accepted data inputs respectively for $x_1$, $x_2$, ..., $x_n$∈A (Step S802).

After this, the converter 701 substitutes a value "m" for the counter variable "c" (Step S803).

Then, the converter 701 calculates the variables $y_1$, $y_2$, ..., $y_n$∈A (Step S804), using the recurrence formulas:

$$y_1 = F_1(x_1, a);$$

$$y_{i+1} = F_{i+1}(x_{i+1}, y_i) \quad (1 \leq i \leq n-1).$$

The converter 701 checks whether the counter variable "c" is 0 (Step S805). In the case where it is determined that the counter variable "c" is not 0 (Step S805; No), the converter 701 substitutes the variables, $y_1$, $y_2$, ..., $y_n$, respectively for the variables $x_1$, $x_2$, ..., $x_n$ (Step S806), and decrements the counter variable "c" by one (Step S807), and the flow returns to the procedure of the step S804.

In the case where the counter variable "c" is 0 (Step S805; Yes), the converter 701 substitutes the variables $y_1$, $y_2$, ..., $y_n$ respectively for the variables $r_1$, $r_2$, ..., $r_n$∈A (Step S808).

The converter 701 uses a single-term arithmetic operation ☆ for the variables, $r_1$, $r_2$, ..., $r_n$∈A, to perform its data conversion, that is, $$(e_1, e_2, \ldots, e_n) = \text{☆}(r_1, r_2, \ldots, r_n).$$

Finally, the converter 701 outputs the variables, $e_1$, $e_2$, ..., $e_n$ (Step S810).

Fifth Embodiment

Figure 9:
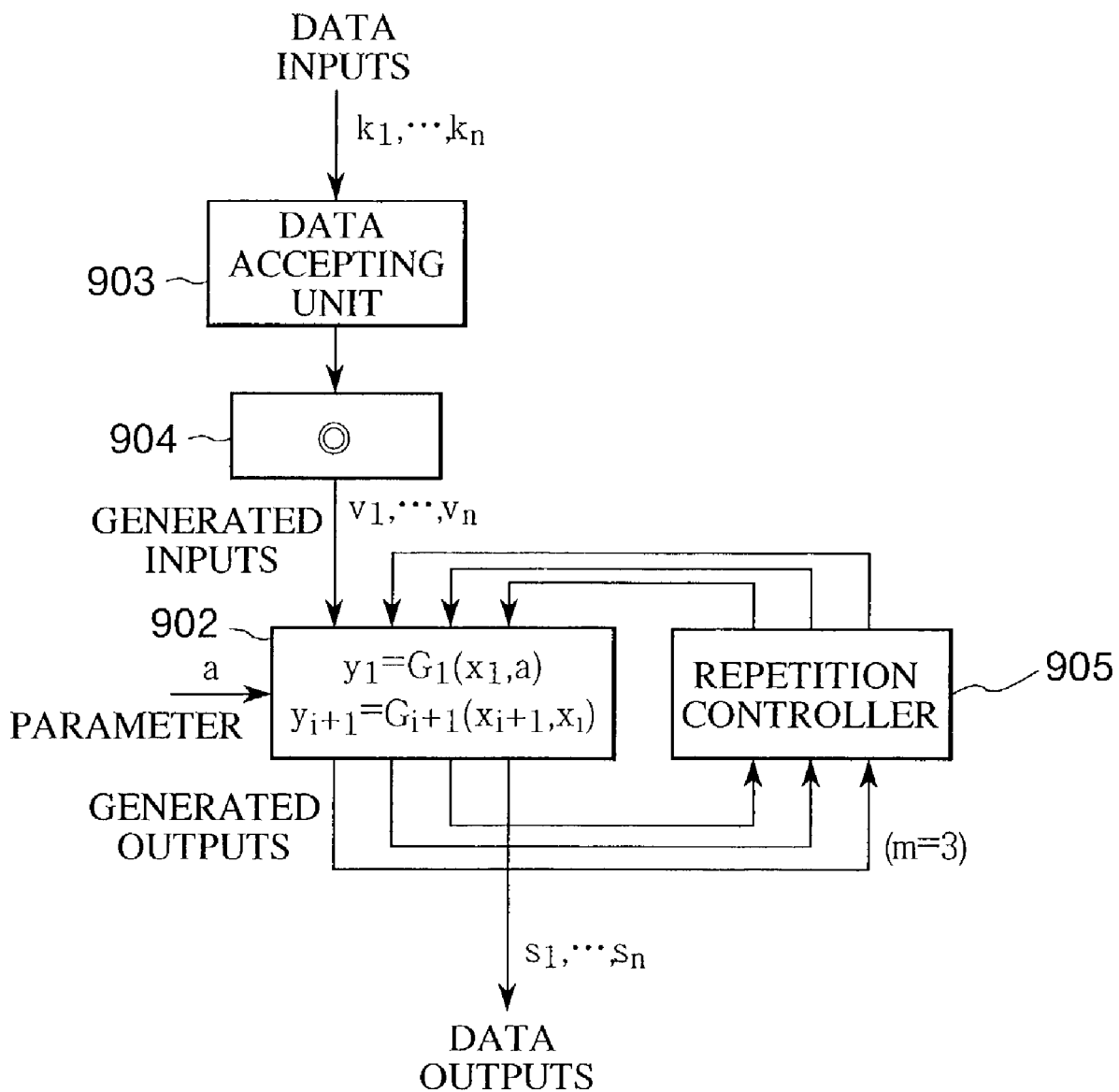
FIG. 9 is an exemplary diagram showing the schematic structure of a converter according to the fifth embodiment of the present invention.

FIG. 9 is an exemplary diagram showing the schematic structure of a converter which is in a pair relationship with the above-described converter 701.

A converter 901 according to the fifth embodiment of the present invention use the same arithmetic operations, functions, parameters, like "$F_i$", "$G_i$", ⊚, ☆, "a", "m", as those used by the converter 701.

The converter 901 uses a parameter "a". The converter 901 includes a generating unit 902, a data accepting unit 903, a converting unit 904, and a repetition controller 905.

The generating unit 902 accepts generated inputs, $x_1$, $x_2$, ..., $x_n$∈A, whose length is "n" in total, and outputs generated outputs, $y_1$, $y_2$, ..., $y_n$∈A whose length is "n" in total, using the following recurrence formulas:

$$y_1 = G_1(x_1, a);$$

$$y_{i+1} = G_{i+1}(x_{i+1}, x_i) \quad (1 \leq i \leq n-1).$$

The data accepting unit 903 accepts data inputs, $h_1$, $h_2$, ..., $h_n$∈A.

The converting unit 905 uses a single-term arithmetic operation ⊚ for the data inputs, $h_1$, $h_2$, ..., $h_n$∈A, to perform its data conversion, that is, $$(v_1, v_2, \ldots, v_n) = \text{⊚}(h_1, h_2, \ldots, h_n), \text{ and}$$

gives the generating unit 902 the results ($v_1$, $v_2$, ..., $v_n$) of the conversion.

The repetition controller 905 gives back the generating unit 902 the generated outputs sent from the generating unit 902 as generated inputs, repeatedly for an "m" (m≧0) number of times. In this case, the generated outputs to be given at the end are data outputs, $s_1, s_2, \ldots, s_n \in A$, whose length is "n" in total.

This calculation (data conversion) can be executed at high speed by a parallel computer having a pipeline process function. However, the above calculation may be executed by a generally-used serial computer.

Figure 10:
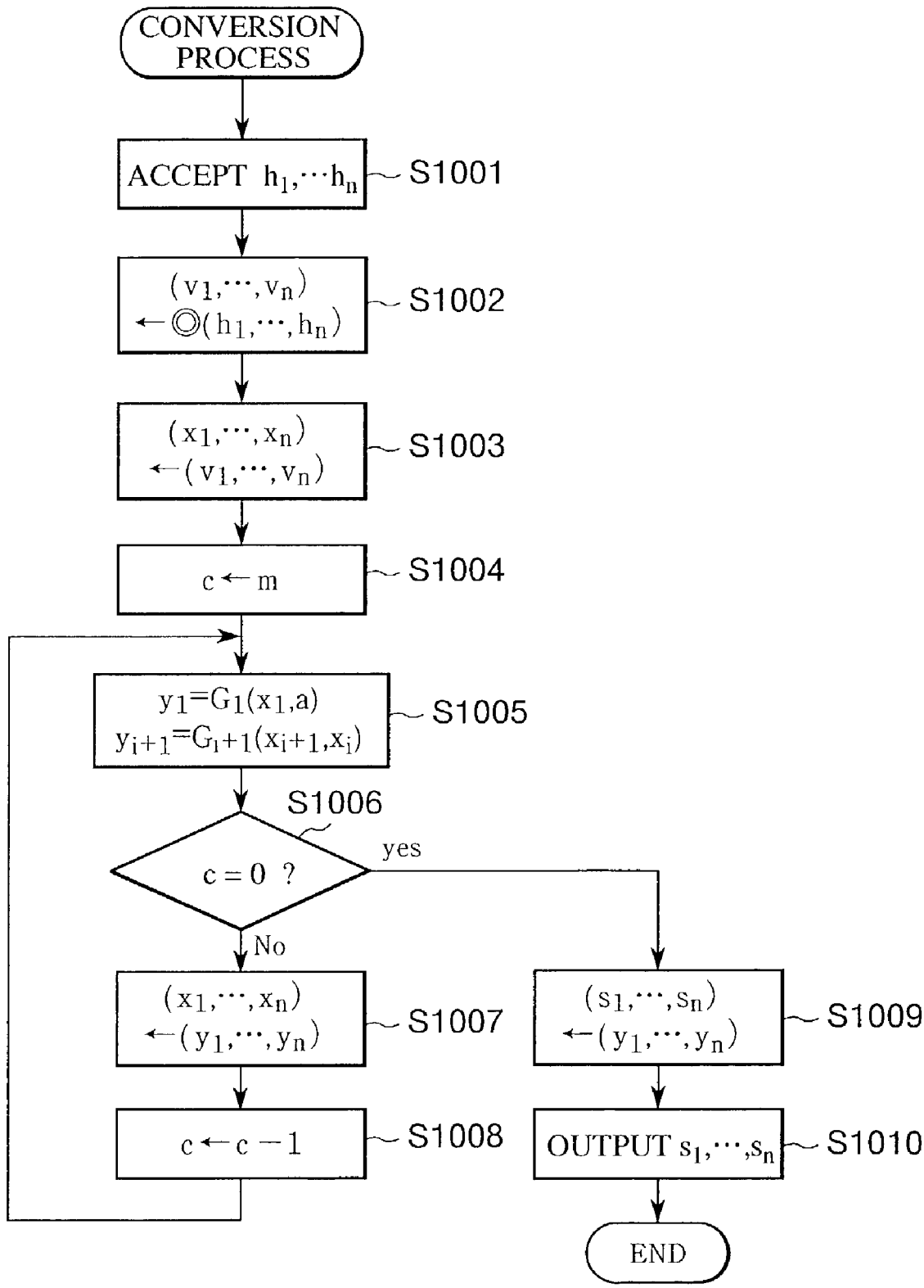
FIG. 10 is a flowchart showing procedures of a conversion process which is carried out by a serial computer serving as the converter of FIG. 9.

FIG. 10 is a flowchart for explaining a conversion process which is carried out by a serial computer serving as the converter 901.

The converter 901 accepts data inputs, $h_1, h_2, \ldots, h_n \in A$, whose length is "n" in total (Step S1001).

The converter 901 uses a single-term arithmetic operation ⊚ for the data inputs, $h_1, h_2, \ldots, h_n$, so as to perform data conversion (Step S1002), that is, $$(v_1, v_2, \ldots, v_n) = \circledcirc (h_1, h_2, \ldots, h_n).$$

The converter 901 substitutes variables, $v_1, v_2, \ldots, v_n$ respectively for $x_1, x_2, \ldots, x_n \in A$ (Step S1003).

The converter 901 substitutes a value "m" for the counter variable "C" (Step S1004).

Further, the converter 901 calculates the variables, $y_1, y_2, \ldots, y_n \in A$ (Step S1005), using the recurrence formulas:

$$y_1 = G_1(x_1, a);$$

$$y_{i+1} = G_{i+1}(x_{i+1}, x_i) \ (1 \leq i \leq n-1).$$

The converter 901 checks whether the counter variable "C" is 0 (Step S1006). In the case where it is determined that the counter variable "C" is not 0 (Step S1006; No), the converter 901 substitutes the variables, $y_1, y_2, \ldots, y_n$ respectively for the variables, $x_1, x_2, \ldots, x_n$ (Step S1007), and decrements the counter value "C" by one (Step S1008), and the flow returns to the procedure of the step S1005.

On the contrary, in the case where it is determined that the counter variable "C" is 0 (Step S1006; Yes), the converter 901 substitutes the variables, $y_1, y_2, \ldots, y_n$ respectively for the variables, $s_1, s_2, \ldots, s_n \in A$ (Step S109).

Finally, the converter 901 outputs the variables, $s_1, s_2, \ldots, s_n$ (Step S1010).

Sixth Embodiment

Explanations will now be made to an encryption/decryption system including the above-described converters 701 and 901 which are in a pair relationship with each other. Either the converter 701 or the converter 901 is used as an encrypting unit, and the other one is used as a decrypting unit, so that there are two different types of systems in accordance with the combination of the two.

Figure 11:
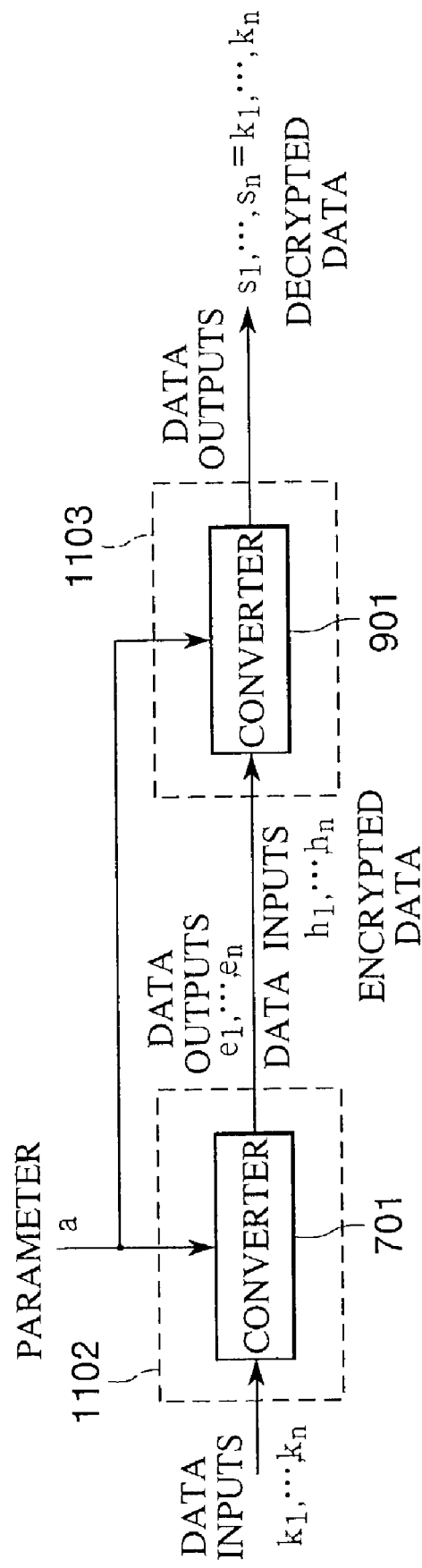
FIG. 11 is an exemplary diagram showing an encryption/decryption system including the converter as an encrypting unit and the converter as a decrypting unit.

FIG. 11 is an exemplary diagram showing the schematic structure of the encryption/decryption system including both the converter 701 as the encrypting unit and the converter 901 as the decrypting unit.

An encryption/decryption system 1101 according to the sixth embodiment of the present invention includes an encrypting unit 1102 and a decrypting unit 1103. The encrypting unit 1102 includes the above-described converter 701, while the decrypting unit 1103 includes the converter 901 which is in a pair relationship with the converter 701.

The encrypting unit 1103 accepts original data, as data inputs, $k_1, k_2, \ldots, k_n$, whose length is "n" in total, and outputs data outputs, $e_1, e_2, \ldots, e_n$, whose length is "n" in total, as encrypted data.

The decrypting unit 1104 accepts the encrypted data whose length is "n" in total, as data inputs, $h_1, h_2, \ldots, h_n$, and outputs data outputs, $s_1, s_2, \ldots, s_n$, whose length is "n" in total, as decrypted data.

According to this structure, the vector-stream private key encrypting system can be realized.

Figure 12:
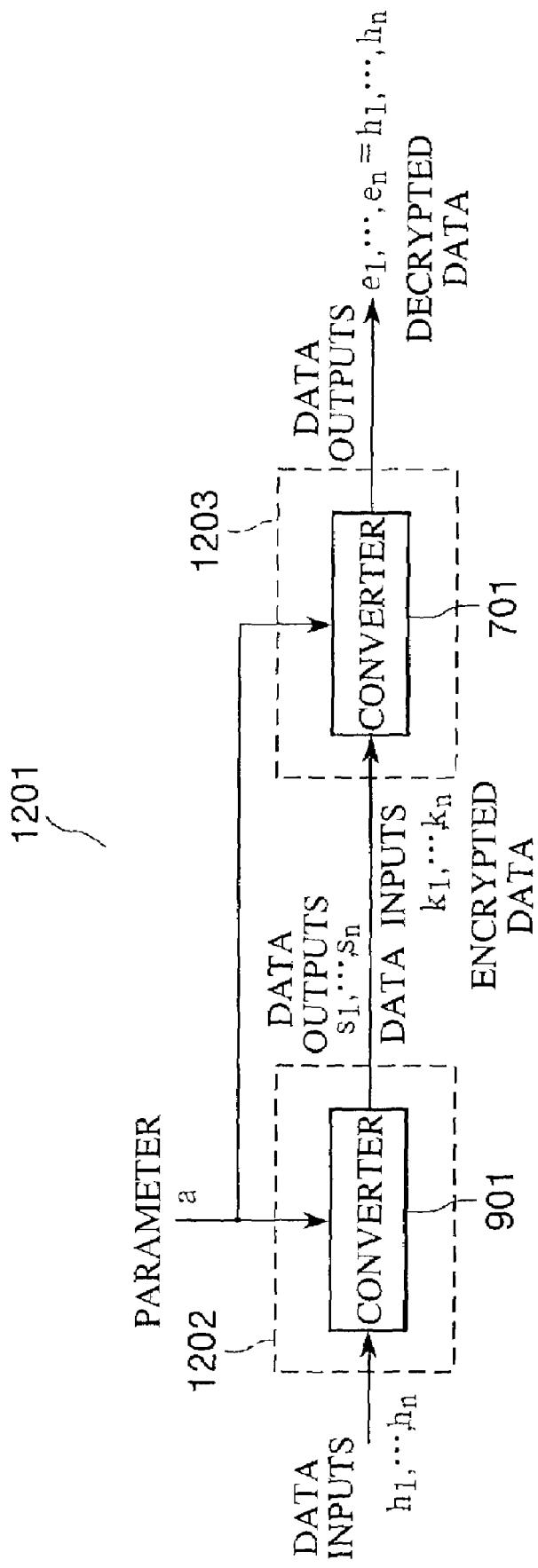
FIG. 12 is an exemplary diagram showing an encryption/decryption system including the converter as an encrypting unit and the converter as a decryption unit.

FIG. 12 is an exemplary diagram showing the schematic structure of an encrypting/decryption system 1201, including the converter 901 serving as an encrypting unit and the converter 701 serving as a decrypting unit.

The encrypting/decryption system 1201 includes an encrypting unit 1202 and a decrypting unit 1203. The encrypting unit 1202 includes the above-described converter 901, while the decrypting unit 1203 includes the converter 701 which is in a pair relationship with the converter 901.

The encrypting unit 1202 accepts original data, as data inputs, $h_1, h_2, \ldots, h_n$, whose length is "n" in total, and outputs data outputs $s_1, s_2, \ldots, s_n$ whose length is "n" in total, as encrypted data.

The decrypting unit 1203 accepts the encrypted data whose length is "n" as data inputs, $k_1, k_2, \ldots, k_n$, and outputs data outputs, $e_1, e_2, \ldots, e_n$, whose length is "n" in total as decrypted data.

Likewise the above, according to this embodiment as well, a vector-stream private key encrypting system can be realized.

The single-term arithmetic operations ⊚ and ☆ adopted in the fourth to sixth embodiments of the present invention will now exemplarily described. In the case where "A" represents one bit space and "z∈A'''" corresponds to a bit string having "n" bits in length, in the single-term arithmetic operation ⊚, the following specific calculation can be employed $$\circledcirc(z_1, z_2, \ldots, z_{a-1}, z_a, \ldots, z_n) = (z_a, \ldots, z_n, z_1, z_2, \ldots, z_{a-1}).$$

This is an "a−1"bit(s) circulation (cyclical shift) arithmetic operation (can also be called "n−a+1" bit(s) circulation arithmetic operation). In terms of the arithmetic operation ☆, there can be employed the opposite bit circulation arithmetic operation for shifting bits in the bit string in the opposite direction to that in the case of the arithmetic operation ⊚. An example of this is $$☆(z_a, \ldots, z_n, \ldots, z_1, z_2, \ldots, z_{a-1}) = (z_1, z_2, \ldots, z_{a-1}, \ldots, z_a, \ldots, z_n).$$

Even in the case where A is t (t>1), such a bit circulation arithmetic operation can spontaneously be expanded, and can be adopted for the present invention.

In the following explanations, a multi-stage converter, including the converter 701 and the converter 901 in multi-stages which are in a pair relation with each other, will be described in each of the seventh and eighth embodiments. Further, an encryption/decryption system using the above multi-stage converter will be described in each of the ninth and tenth embodiments.

Seventh Embodiment

Figure 13:
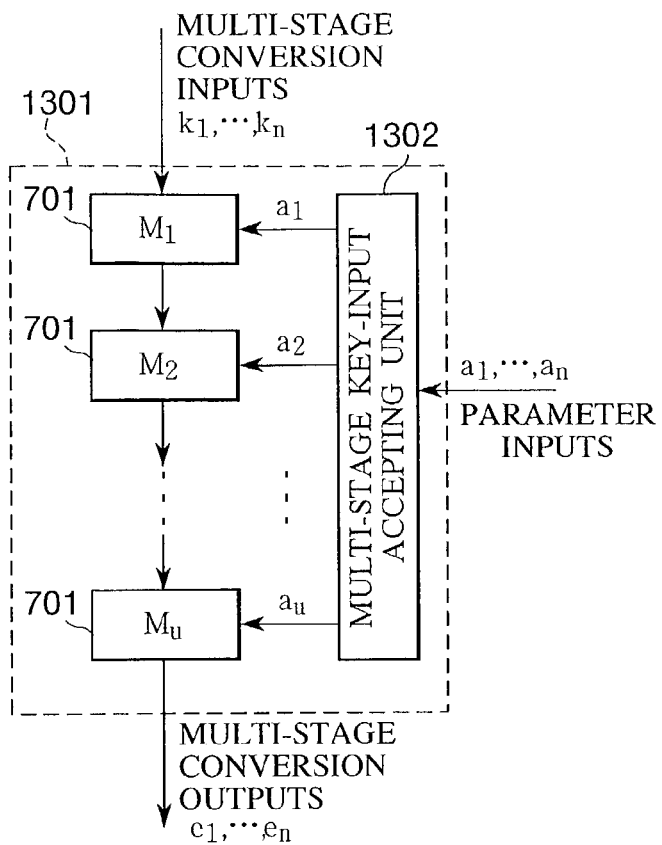
FIG. 13 is an exemplary diagram showing the schematic structure of a multi-stage converter according to the seventh embodiment of the present invention.

FIG. 13 is an exemplary diagram showing the schematic structure of a multi-stage converter 1301 according to the seventh embodiment of the present invention.

The multi-stage converter 1301 includes a "u" number of converters 701 (the "J"-th converter is called $M_j$ ($1 \leq j \leq u$) and a multi-stage key-input accepting unit 1302.

The multi-stage key-input accepting unit 1302 accepts parameter inputs, $a_1, a_2, \ldots, a_u \in A$, whose length is "u" in total. The multi-stage key-input accepting unit 1302 sets the "j"-th parameter input $a_j$ as a predetermined parameter of the corresponding converter 701 $M_j$.

The converter 701 $M_1$ accepts multi-stage conversion inputs, $k_1, k_2, \ldots, k_n$, as data inputs.

Those data outputs which are output by the converter 701 $M_i$ ($1 \leq i \leq u-1$) are given to the converter 701 $M_{i+1}$, as data inputs.

The converter 701 $M_u$ outputs data outputs, $e_1, e_2, \ldots, e_n$, whose length is "n" in total, as multi-stage conversion outputs.

Eighth Embodiment

Figure 14:
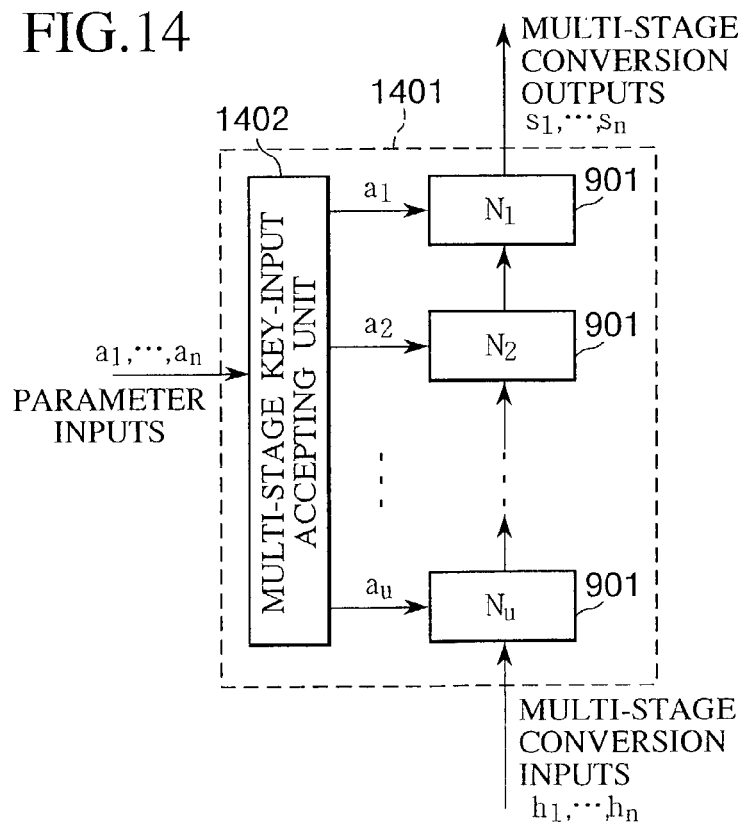
FIG. 14 is an exemplary diagram showing the schematic structure of a multi-stage converter according to the eighth embodiment of the present invention.

FIG. 14 is an exemplary diagram showing the schematic structure of a multi-stage converter 1401 which is in a pair relationship with the above-described multi-stage converter 1301.

The multi-stage converter 1401 includes a "u" number of converters 901 (the "j"-th converter is called $N_j$ ($1 \leq j \leq u$)), and a multi-stage key-input accepting unit 1402.

The multi-stage key-input accepting unit 1402 accepts parameter inputs $a_1, a_2, \ldots, a_n \in A$ whose length is "n" in total. The multi-stage key-input accepting unit 1402 sets the "J"-th parameter input $a_j$ as a predetermined parameter of the corresponding converter 901 $N_j$.

The converter 901 $N_u$ accepts multi-stage conversion inputs, $h_1, h_2, \ldots, h_n$, whose length is "n" in total, as data inputs.

Those data outputs which are output by the converter 901 $N_{i+1}$ ($1 \leq i \leq u-1$) are given to the converter 901 $N_1$, as data inputs.

The converter 901 $N_1$ outputs data outputs, $s_1, s_2, \ldots, s_n$, whose length is "n" in total, as multi-stage conversion outputs.

Ninth Embodiment

Figure 15:
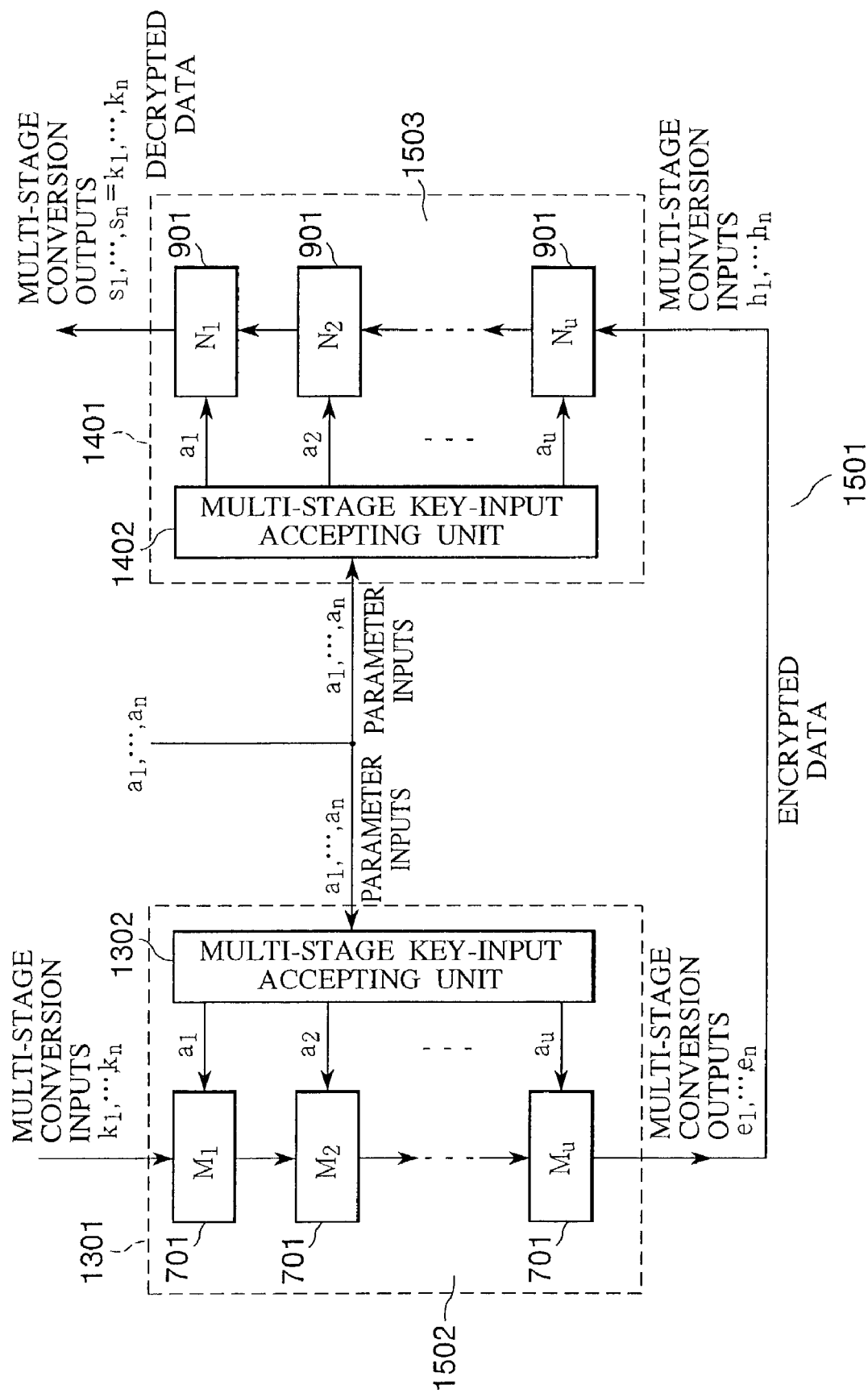
FIG. 15 is an exemplary diagram showing the schematic structure of an encryption/decryption system, according to the ninth embodiment of the present invention, including the multi-stage converters which are in a pair relationship with each other.

FIG. 15 is an exemplary diagram showing the schematic structure of an encryption/decryption system 1501 including the above-described multi-stage converter 1301 and the multi-stage converter 1401 which are in a pair relationship with each other.

The encryption/decryption system 1501 includes the above-described multi-stage converter 1301, serving as an encrypting unit 1502, and the above-described multi-stage converter 1401, serving as a decrypting unit 1503.

$F_i$, $G_i$, ☆ and ⊚ are commonly used by the encrypting unit 1502 and the decrypting unit 1503.

Those parameter inputs, $a_1, a_2, \ldots, a_u$, are commonly accepted by the encrypting unit 1502 and the decrypting unit 1503.

The encrypting unit 1502 accepts original data as multi-stage conversion inputs, $k_1, k_2, \ldots, k_n$, whose length is "n" in total, and outputs multi-stage conversion outputs, $e_1, e_2, \ldots, e_n$, whose length is "n" in total as encrypted data.

The decrypting unit 1503 accepts the encrypted data as multi-stage conversion inputs, $h_1, h_2, \ldots, h_n$, whose length is "n" in total, and outputs multi-stage conversion outputs, $s_1, s_2, \ldots, s_n$, whose length is "n" in total as decrypted data.

According to this embodiment, a vector-stream private key encryption system can be realized.

Tenth Embodiment

Figure 16:
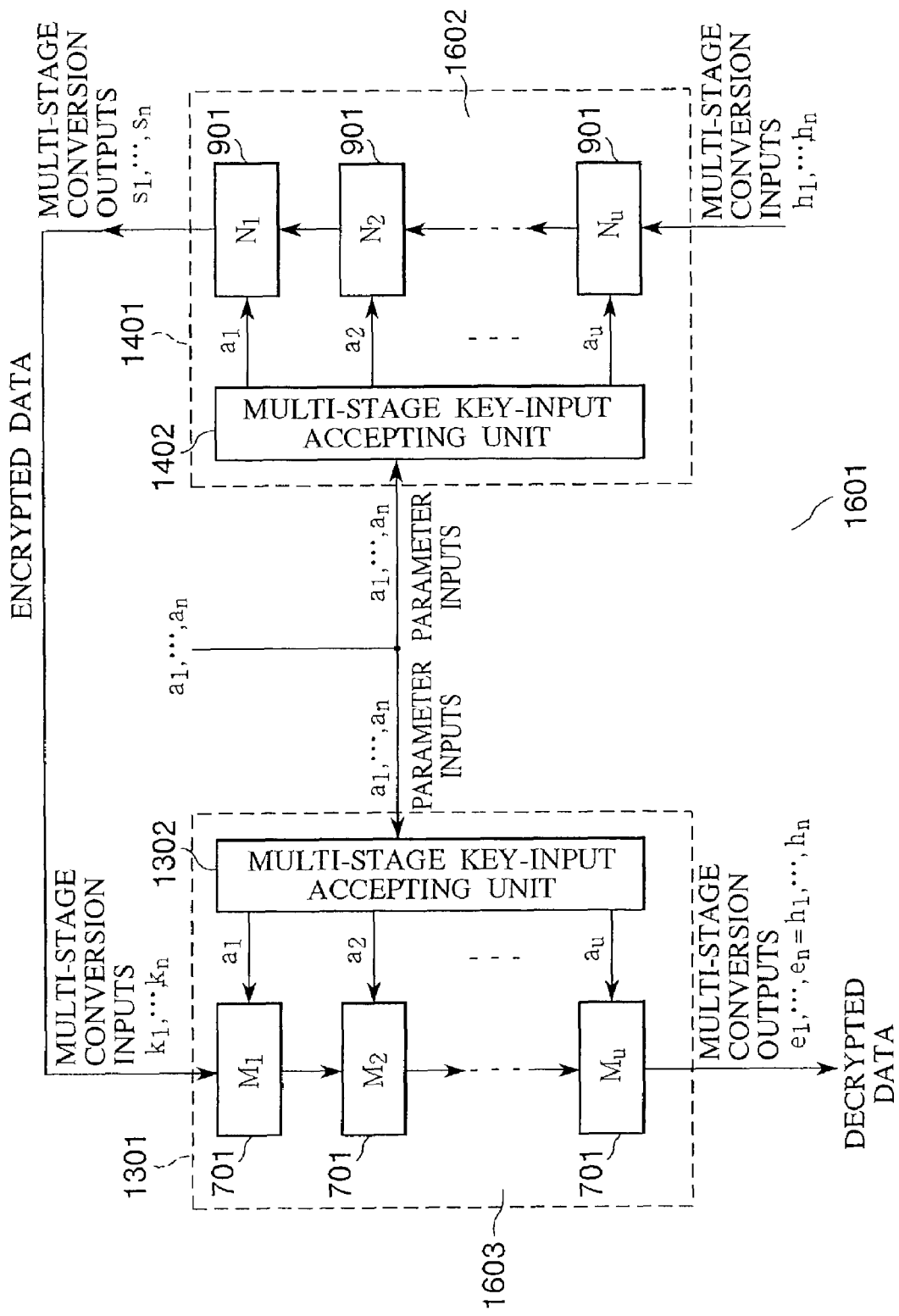
FIG. 16 is an exemplary diagram showing the schematic structure of an encryption/decryption system, according to the tenth embodiment of the present invention, including the multi-stage converters which are in a pair relationship with each other.

FIG. 16 is an exemplary diagram showing the schematic structure of an encryption/decryption system 1601, including the above-described multi-stage converter 1301 and the multi-stage converter 1401 which are in a pair relationship with each other.

The encryption/decryption system 1601 includes the above-described multi-stage converter 1401 as an encrypting unit 1602 and the above-described multi-stage converter 1301 as a decrypting unit 1603.

$F_i$, $G_i$, ☆ and ⊚ are commonly used by the encrypting unit 1602 and the decrypting unit 1603.

Those parameter inputs, $a_1, a_2, \ldots, a_u$, are commonly accepted by the encrypting unit 1602 and the decrypting unit 1603.

The encrypting unit 1602 accepts original data as multi-stage conversion inputs, $h_1, h_2, \ldots, h_n$, whose length is "n" in total, and outputs multi-stage conversion outputs, $s_1, s_2, \ldots, s_n$, whose length is "n" in total as encrypted data.

Further, the decrypting unit 1603 accepts the encrypted data as multi-stage conversion inputs, $k_1, k_2, \ldots, k_n$, whose length is "n" in total, and outputs multi-stage conversion outputs, $e_1, e_2, \ldots, e_n$, whose length is "n" in total as the decrypted data.

According to this embodiment also, a vector-stream private key encryption system can be realized.

In the vector-stream private key encryption system, the computation parallelism thereof is enhanced, if the dimension number "n" is set large. Hence, with the utilization of an FPGA (Field Programmable Gate Array), etc. or with the structure suitable for parallel processing using a dedicated chip, etc., high-speed processing may be further expected.

Eleventh Embodiment

Likewise the disclosure of U.S. Pat. No. 3,030,341 and Unexamined Japanese Patent Application KOKAI Publication No. 2001-175168, when the basic conversion of the present invention has an equal distribution, it also results in an equal distribution of the multi-dimensional vector(s) in the synthetic conversion of the present conversion.

Figure 17:
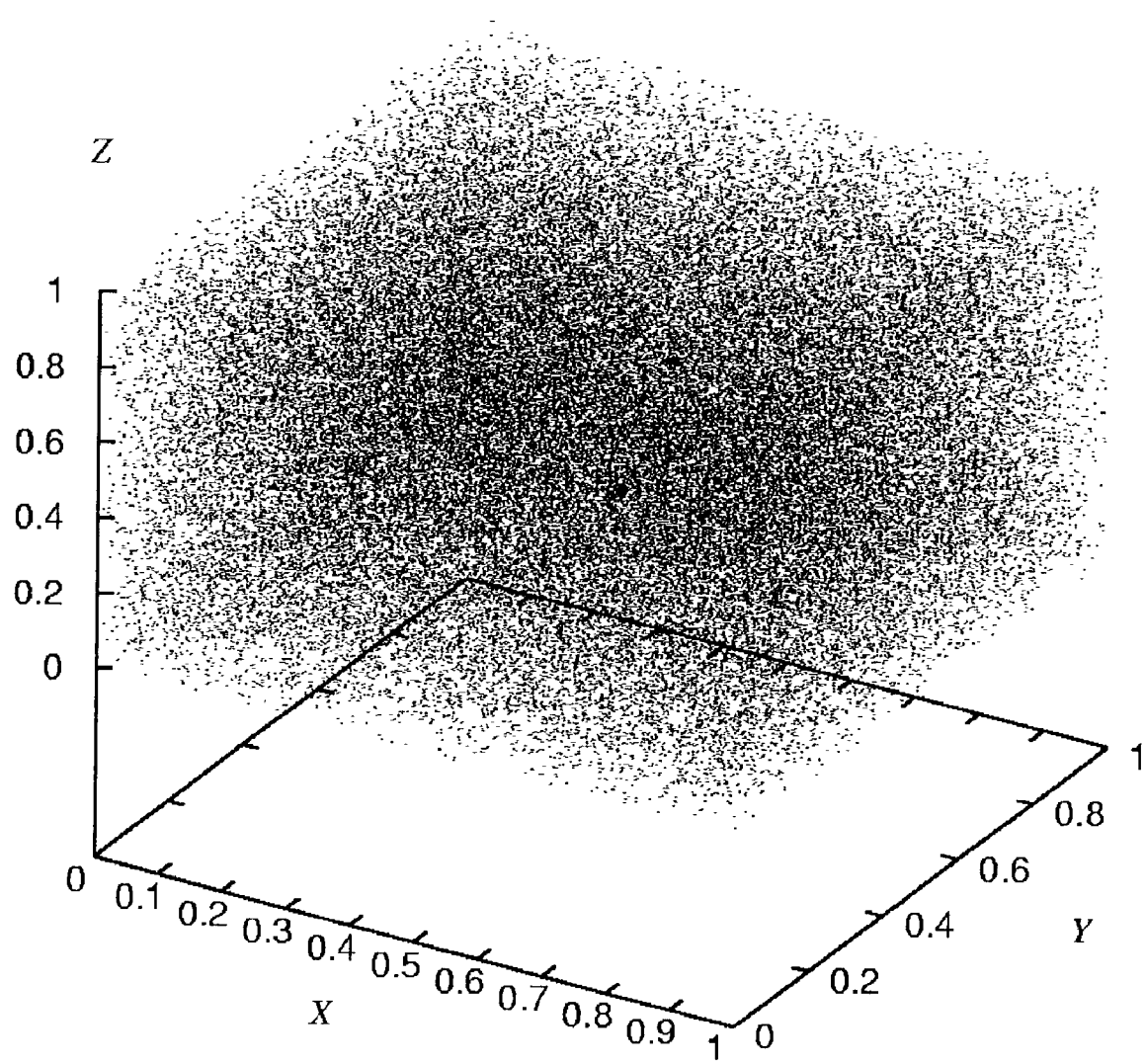
FIG. 17 is a distribution diagram showing a distribution of data generated according to the technique of the present invention.

FIG. 17 is shows a data distribution of data generated by a three-dimensional vector-stream private key encryption system, in a cube $[0, 1]^3$.

As seen from FIG. 17, it is obvious that data is equally distributed in the cube.

In the encryption process, the statistical stability, like an equal frequency characteristic, is required. As obvious from FIG. 17, according to the technique of the present invention, the data distribution shows the equal frequency characteristic.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-261698 filed on Aug. 30, 2001, and including specification, claims, drawings and summary. The disclosure of the above Japanese Patent Application is incorporated herein by reference in its entirety.

What is claimed is:

1. A computer readable medium having stored thereon a converter using:

an "n" ($n \geq 1$) number of conversion functions, $F_1, F_2, \ldots, F_n$: $A \times A \rightarrow A$, with respect to a domain A;

a binary exclusive OR operator, XOR: $A \times A \to A$; and a predetermined parameter, $a \in A$, and said converter comprising:

a generating unit accepting generative inputs, $x_1, x_2, \ldots, x_n \in A$, and generating generative outputs, $y_1, y_2, \ldots, y_n \in A$, using recurrence formulas, $y_1 = F_1(x_1, a)$, and $y_{i+1} = F_{i+1}(x_{i+1}, x_i)$ (for $1 \leq i \leq n-1$);

a key accepting unit accepting key inputs, $k_1, k_2, \ldots, k_n \in A$, and giving the accepted key inputs as generative inputs to said generating unit;

a repetition controller giving the generative outputs from said generating unit as generative inputs to said generating unit, for an "m" ($m \geq 0$) number of times, and setting the last generative outputs as a random number sequence, $r_1, r_2, \ldots, r_n \in A$;

a data accepting unit accepting data inputs, $d_1, d_2, \ldots, d_n \in A$; and a converting unit converting the data inputs into data outputs, $e_1, e_2, \ldots, e_n \in A$ using a formula $e_i = d_i \text{ XOR } r_i$ ($1 \leq i \leq n$), and outputting the data outputs; and wherein at least one of the conversion functions, $F_1, F_2, \ldots F_n$, is either a function, $ma(\bullet, \bullet)$, or an inverse function of $ma(\bullet, \bullet)$, $ma^{-1}(\bullet, \bullet)$, and wherein the function, $ma(\bullet, \bullet)$, is defined, by positive integers M, s, "M"-number system rounding up function, ceil($\bullet$), and "M"-number system rounding down function, floor($\bullet$), as:

$ma(x, b) = \text{ceil}(xM^s/b)$ (for $1 \leq x \leq b$), and $ma(x, b) = \text{floor}(M^s(x-b)/(M^s-b))+1$ (for $b < x \leq M^s$), and the inverse function, $ma^{-1}(\bullet, \bullet)$, is defined as:

$ma^{-1}(y, b) = x_1$ (for $q < x_1$), and $ma^{-1}(y, b) = x_2$ (for $x_1 \leq q$)

where $x_1 = \text{floor}(M^{-s} b y)$, $x_2 = \text{ceil}((M^{-s} b - 1)y + M^s)$, and $q = b(x_2 - M^s)/(b - M^{-s})$.

2. A computer readable medium having stored thereon an encryption/decryption system comprising:

a converter according to claim 1 as an encrypting unit; and another converter having a same structure of a converter according to claim 1 as a decrypting unit, wherein:

"$F_1$", "$F_2$", ..., "$F_n$", and "a" are commonly used by said encrypting unit and said decrypting unit;

said encrypting unit and said decrypting unit commonly accepts the key inputs;

said encrypting unit accepts original data as the data inputs and outputs the data outputs as encrypted data; and said decrypting unit accepts the encrypted data as the data inputs, and outputs the data outputs as decrypted data.

3. A computer readable medium having stored thereon a converter using:

an "n" ($n \geq 1$) number of conversion functions $F_1, F_2, \ldots, F_n$: $A \times A \to A$ and their inverse conversion functions $G_1, G_2, \ldots, G_n$: $A \times A \to A$, with respect to a domain A, wherein, for arbitrary $x \in A$ and $y \in A$, conditions of $F_i(G_i(x,y),y) = x$, and $G_i(F_i(x,y),y) = x$ are satisfied;

a unary arithmetic operation, $\star: A^n \to A^n$, and its reverse unary arithmetic operation, $\odot: A \times A \to A$, wherein, for arbitrary $z \in A^n$, conditions of $\star(\odot z) = z$, and $\odot(\star z) = z$ are satisfied; and a predetermined parameter, $a \in A$, and said converter comprising:

a generating unit accepting generative inputs, $x_1, x_2, \ldots, x_n \in A$, whose length is "n" in total, and generating generative outputs, $y_1, y_2, \ldots, y_n \in A$, using recurrence formulas $y_1 = F_1(x_1, a)$, and $y_{i+1} = F_{i+1}(x_{i+1}, y_i)$ (for $1 \leq i \leq n-1$);

a data accepting unit accepting data inputs, $k_1, k_2, \ldots, k_n \in A$, and giving the accepted data inputs as generative inputs to said generating unit;

a repetition controller giving the generative outputs from said generating unit as generative inputs to said generating unit, for an "m" ($m \geq 0$) number of times, and setting the last generative outputs as a random number sequence, $r_1, r_2, \ldots, r_n \in A$;

a converting unit applying the unary arithmetic operation, $\star$, to the random number string, $r_1, r_2, \ldots, r_n \in A$, to perform its data conversion, $(e_1, e_2, \ldots, e_n) = \star(r_1, r_2, \ldots, r_n)$; and outputting data outputs, $e_1, e_2, \ldots, e_n$, wherein at least one of the conversion functions, $F_1, F_2, \ldots, F_n$, is either a function, $ma(\bullet, \bullet)$, or an inverse function of $ma(\bullet, \bullet)$, $ma^{-1}(\bullet, \bullet)$, and the function, $ma(\bullet, \bullet)$, is defined, by positive integers M, s, "M"-number system rounding up function, ceil($\bullet$), and "M"-number system rounding down function, floor($\bullet$), as:

$ma(x, b) = \text{ceil}(xM^s/b)$ (for $1 \leq x \leq b$), and $ma(x, b) = \text{floor}(M^s(x-b)/(M^s-b))+1$ (for $b < x \leq M^s$), and the inverse function $ma^{-1}(\bullet, \bullet)$, is defined as:

$ma^{-1}(y, b) = x_1$ (for $q < x_1$), and $ma^{-1}(y, b) = x_2$ (for $x_1 \leq q$), where $x_1 = \text{floor}(M^{-s} b y)$, $x_2 = \text{ceil}((M^{-s} b - 1)y + M^s)$, and $q = b(x_2 - M^s)/(b - M^{-s})$.

4. A computer readable medium having stored thereon a multi-stage converter comprising:

a "u" number of converters $M_1, M_2, \ldots, M_u$, according to claim 3; and a multi-stage key-input accepting unit which accepts parameter inputs $a_1, a_2, \ldots, a_u \in A$, and sets the "j"-th parameter input, $a_j$, included in the accepted parameter inputs, as the predetermined parameter "a" of the converter $M_j$, wherein:

a converter $M_1$ included in said "u" number of converters accepts multi-stage conversion inputs, $k_1, k_2, \ldots, k_n$ as the data inputs, the data outputs, which are output by the converter $M_i$ ($1 \leq i \leq u-1$) included in said "u" number of converters, are given to the converter $M_{i+1}$ included in said "u" number of converters, as the data inputs, and a converter $M_u$, included in said "u" number of converters outputs the data outputs, $e_1, e_2, \ldots, e_n$, as multi-stage conversion outputs.

5. A computer readable medium having stored thereon a multi-stage converter comprising:

a "u" number of converters, $M_1, M_2, \ldots, M_u$, according to claim 3; and a multi-stage key-input accepting unit which accepts parameter inputs $a_1, a_2, \ldots, a_u \epsilon A$, and sets the "j"-th parameter input, $a_j$, included in the accepted parameter inputs, as the predetermined parameter "a" of the converter $M_j$, wherein:

a converter $M_u$, included in said "u" number of converters accepts multi-stage conversion inputs, $h_1, h_2, \ldots, h_n$ as the data inputs, data outputs, which are output by the converter $M_{i+1}$ ($1 \leq i \leq u-1$) included in said "u" number of converters, are given to the converter $M_i$ included in said "u" number of converters, as the data inputs, and a converter $M_1$ included in said "u" number of converters outputs data outputs, $s_1, s_2, \ldots, s_n$ as multi-stage conversion outputs.

6. A computer readable medium having stored thereon a converter using:

an "n" ($n \geq 1$) number of conversion functions, $F_1, F_2, \ldots, F_n$: $A \times A \rightarrow A$, and their inverse conversion functions, $G_1, G_2, \ldots, G_n$: $A \times A \rightarrow A$, with respect to a domain A, wherein, for arbitrary $x \epsilon A$ and $y \epsilon A$, conditions of $$F_i(G_i(x,y),y)=x, \text{ and}$$

$$G_i(F_i(x,y),y)=x$$

are satisfied;

a unary arithmetic operation, ☆: $A^n \rightarrow A^n$, and its reverse unary arithmetic operation, ⊚: $A \times A \rightarrow A$, wherein, for arbitrary $z \epsilon A^n$, conditions of $$☆(⊚z)=z, \text{ and}$$

$$⊚(☆z)=z$$

are satisfied; and a predetermined parameter, $a \epsilon A$, and the converter comprising:

a generating unit accepting generative inputs, $x_1, x_2, \ldots, x_n \epsilon A$, and generating generative outputs, $y_1, y_2, \ldots, y_n \epsilon A$ using recurrence formulas, $$y_1 = G_1(x_1, a), \text{ and}$$

$$y_{i+1} = G_{i+1}(x_{i+1}, x_i) \text{ (for } 1 \leq i \leq n-1\text{);}$$

a data accepting unit accepting data inputs, $h_1, h_2, \ldots, h_n \epsilon A$, whose length is "n" in total and giving the accepted data inputs as generative inputs to said generating unit;

a converting unit applying the unary arithmetic operation, ☆, to the random number string, $r_1, r_2, \ldots, r_n \epsilon A$, to perform its data conversion, $(v_1, v_2, \ldots, v_n) = ☆(h_1, h_2, \ldots, h_n)$, and giving results of the data conversion, $v_1, v_2, \ldots, v_n$, to said generating unit; and a repetition controller giving the generative outputs from said generating unit as generative inputs to said generating unit, for an "m" ($m \geq 0$) number of times, and setting the last generative outputs as a random number sequence, $r_1, r_2, \ldots, r_n \epsilon A$, and wherein, at least one of the conversion functions, $F_1, F_2, \ldots, F_n$, is either a function, $ma(\bullet, \bullet)$, or an inverse function of $ma(\bullet, \bullet)$, $ma^{-1}(\bullet, \bullet)$, and the function, $ma(\bullet, \bullet)$, is defined, by positive integers M, s, "M"-number system rounding up function, $ceil(\bullet)$, and "M"-number system rounding down function, $floor(\bullet)$, as:

$$ma(x,b) = ceil(xM^s/b) \text{ (for } 1 \leq x \leq b\text{), and}$$

$$ma(x,b) = floor(M^s(x-b)/(M^s-b))+1 \text{ (for } b<x \leq M^s\text{),}$$

and the inverse function, $ma^{-1}(\bullet, \bullet)$, is defined as:

$$ma^{-1}(y,b) = x_1 \text{ (for } q<x_1\text{), and}$$

$$ma^{-1}(y,b) = x_2 \text{ (for } x_1 \leq q\text{),}$$

where $$x_1 = floor(M^{-s}by),$$

$$x_2 = ceil((M^{-s}b-1)y+M^s), \text{ and}$$

$$q = b(x_2-M^s)/(b-M^s).$$

7. A computer readable medium having stored thereon an encryption/decryption system comprising:

a converter as an encrypting unit using:

an "n" ($n \geq 1$) number of conversion functions $F1, F2, \ldots, Fn$: $A \times A \rightarrow A$ and their inverse conversion functions $G1, G2, \ldots, Gn$: $A \times A \rightarrow A$, with respect to a domain A, wherein, for arbitrary x A and y A, conditions of $$Fi(Gi(x,y),y)=x, \text{ and}$$

$$Gi(Fi(x,y),y)=x$$

are satisfied;

a unary arithmetic operation, :$An \rightarrow An$, and its reverse unary arithmetic operation, :$A \times A \rightarrow A$, wherein, for arbitrary z An, conditions of $$(z)=z, \text{ and}$$

$$(z)=z$$

are satisfied; and a predetermined parameter, a A, and said converter comprising:

a generating unit accepting generative inputs, $x1, x2, \ldots, xn$ A, whose length is "n" in total, and generating generative outputs, $y1, y2, \ldots, yn$ A, using recurrence formulas $$y1 = F1(x1, a), \text{ and}$$

$$yi+1 = Fi+1(xi+1, yi) \text{ (for } 1 \leq i \leq n-1\text{);}$$

a data accepting unit accepting data inputs, $k1, k2, \ldots, kn$ A, and giving the accepted data inputs as generative inputs to said generating unit;

a repetition controller giving the generative outputs from said generating unit as generative inputs to said generating unit, for an "m" (m≧0) number of times, and setting the last generative outputs as a random number sequence, r1, r2, . . . , rn A;

a converting unit applying the unary arithmetic operation, , to the random number string, r1, r2, . . . , rn A, to perform its data conversion, (e1, e2, . . . , en)=(r1, r2, . . . , rn); and outputting data outputs, e1, e2, . . . , en, wherein at least one of the conversion functions, F1, F2, . . . , Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$$ma(x,b)=\text{ceil}(xMs/b) \text{ (for } 1\leq x\leq b\text{), and}$$

$$ma(x,b)=\text{floor}(Ms(x-b)/(Ms-b))+1 \text{ (for } b<x\leq Ms\text{),}$$

and the inverse function ma−1(•,•), is defined as:

$$ma-1(y,b)=x1 \text{ (for } q<x1\text{), and}$$

$$ma-1(y,b)=x2 \text{ (for } x1\leq q\text{),}$$

where $$x1=\text{floor}(M-sby),$$

$$x2=\text{ceil}((M-sb-1)y+Ms), \text{ and}$$

$$q=b(x2-Ms)/(b-Ms); \text{ and}$$

a converter as a decrypting unit using:

an "n" (n≧1) number of conversion functions, F1, F2, . . . , Fn: A×A→A, and their inverse conversion functions, G1, G2, . . . , Gn: A×A→A, with respect to a domain A, wherein, for arbitrary x A and y A, conditions of $$Fi(Gi(x,y),y)=x, \text{ and}$$

$$Gi(Fi(x,y),y)=x$$

are satisfied;

a unary arithmetic operation, :An→An, and its reverse unary arithmetic operation, :A×A→A, wherein, for arbitrary z An, conditions of $$(z)=z, \text{ and}$$

$$(z)=z$$

are satisfied; and a predetermined parameter, a A, and the converter comprising:

a generating unit accepting generative inputs, x1, x2, . . . , xn A, and generating generative outputs, y1, y2, . . . , yn A using recurrence formulas, $$y1=G1(x1,a), \text{ and}$$

$$yi+1=Gi+1(xi+1,xi) \text{ (for } 1\leq i\leq n-1\text{);}$$

a data accepting unit accepting data inputs, h1, h2, . . . , hn A, whose length is "n" in total and giving the accepted data inputs as generative inputs to said generating unit;

a converting unit applying the unary arithmetic operation, , to the random number string, r1, r2, . . . , rn A, to perform its data conversion, (v1, v2, . . . , vn)=(h1, h2, . . . , hn), and giving results of the data conversion, v1, v2, . . . , vn, to said generating unit; and a repetition controller giving the generative outputs from said generating unit as generative inputs to said generating unit, for an "m" (m≧0) number of times, and setting the last generative outputs as a random number sequence, r1, r2, . . . , rn A, and wherein, at least one of the conversion functions, F1, F2, . . . , Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$$ma(x,b)=\text{ceil}(xMs/b) \text{ (for } 1\leq x\leq b\text{), and}$$

$$ma(x,b)=\text{floor}(Ms(x-b)/(Ms-b))+1 \text{ (for } b<x\leq Ms\text{),}$$

and the inverse function, ma−1(•,•), is defined as:

$$ma-1(y,b)=x1 \text{ (for } q<x1\text{), and}$$

$$ma-1(y,b)=x2 \text{ (for } x1\leq q\text{),}$$

where $$x1=\text{floor}(M-sby),$$

$$x2=\text{ceil}((M-sb-1)y+Ms), \text{ and}$$

$$q=b(x2-Ms)/(b-Ms),$$

wherein:

"F1", "F2", . . . , "Fn", "G1", "G2", . . . , "Gn", " ", " ", and "a", are commonly used by said encrypting unit and said decrypting unit;

said encrypting unit accepts original data as the data inputs, k1, k2, . . . , kn, and outputs the data outputs, e1, e2, . . . , en as encrypted data; and said decrypting unit accepts the encrypted data as the data inputs, h1, h2, . . . , hn, and outputs the data outputs, s1, s2, . . . , sn, whose length is "n" in total as decrypted data.

8. A computer readable medium having stored thereon an encryption/decryption system comprising:

a converter as an encrypting unit using:

an "n" (n≧1) number of conversion functions, F1, F2, . . . , Fn: A×A→A, and their inverse conversion functions, G1, G2, . . . , Gn: A×A→A, with respect to a domain A, wherein, for arbitrary x A and y A, conditions of $$Fi(Gi(x,y),y)=x, \text{ and}$$

$$Gi(Fi(x,y),y)=x$$

are satisfied;

a unary arithmetic operation, :An→An, and its reverse unary arithmetic operation, :A×A→A, wherein, for arbitrary z An, conditions of $$(z)=z, \text{ and}$$

$$(z)=z$$

are satisfied; and a predetermined parameter, a A, and the converter comprising:

a generating unit accepting generative inputs, x1, x2, . . . , xn A, and generating generative outputs, y1, y2, . . . , yn A using recurrence formulas, $$y1=G1(x1,a), \text{ and}$$

$$yi+1=Gi+1(xi+1,xi) \text{ (for } 1\leq i\leq n-1\text{);}$$

a data accepting unit accepting data inputs, h1, h2, ..., hn A, whose length is "n" in total and giving the accepted data inputs as generative inputs to said generating unit;

a converting unit applying the unary arithmetic operation, , to the random number string, r1, r2, ..., rn A, to perform its data conversion, (v1, v2, ..., vn)=(h1, h2, ..., hn), and giving results of the data conversion, v1, v2, ..., vn, to said generating unit; and a repetition controller giving the generative outputs from said generating unit as generative inputs to said generating unit, for an "m" (m≧0) number of times, and setting the last generative outputs as a random number sequence, r1, r2, ..., rn A, and wherein, at least one of the conversion functions, F1, F2, ..., Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$ma(x,b)=\text{ceil}(xMs/b)$ (for $1≦x≦b$), and $ma(x,b)=\text{floor}(Ms(x-b)/(Ms-b))+1$ for $b<x≦Ms$), and the inverse function, ma−1(•,•), is defined as:

$ma-1(y,b)=x1$ (for $q<x1$), and $ma-1(y,b)=x2$ (for $x1≦q$), where $x1=\text{floor}(M-sby)$, $x2=\text{ceil}((M-sb-1)y+Ms)$, and $q=b(x2-Ms)/(b-Ms)$; and a converter as a decrypting unit using:

an "n" (n≧1) number of conversion functions F1, F2, ..., Fn: A×A→A and their inverse conversion functions G1, G2, ..., Gn: A×A→A, with respect to a domain A, wherein, for arbitrary x A and y A, conditions of $Fi(Gi(x,y),y)=x$, and $Gi(Fi(x,y),y)=x$ are satisfied;

a unary arithmetic operation, :An→An, and its reverse unary arithmetic operation, :A×A→A, wherein, for arbitrary z An, conditions of $(z)=z$, and $(z)=z$ are satisfied; and a predetermined parameter, a A, and said converter comprising:

a generating unit accepting generative inputs, x1, x2, ..., xn A, whose length is "n" in total, and generating generative outputs, y1, y2, ..., yn A, using recurrence formulas $y1=F1(x1,a)$, and $yi+1=Fi+1(xi+1,yi)$ (for $1≦i≦n-1$);

a data accepting unit accepting data inputs, k1, k2, ..., kn A, and giving the accepted data inputs as generative inputs to said generating unit;

a repetition controller giving the generative outputs from said generating unit as generative inputs to said generating unit, for an "m" (m≧0) number of times, and setting the last generative outputs as a random number sequence, r1, r2, ..., rn A;

a converting unit applying the unary arithmetic operation, , to the random number string, r1, r2, ..., rn A, to perform its data conversion, (e1, e2, ..., en)=(r1, r2, ..., rn); and outputting data outputs, e1, e2, ..., en, wherein at least one of the conversion functions, F1, F2, ..., Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$ma(x,b)=\text{ceil}(xMs/b)$ (for $1≦x≦b$), and $ma(x,b)=\text{floor}(Ms(x-b)/(Ms-b))+1$ (for $b<x≦Ms$), and the inverse function ma−1(•,•), is defined as:

$ma-1(y,b)=x1$ (for $q<x1$), and $ma-1(y,b)=x2$ (for $x1≦q$), where $x1=\text{floor}(M-sby)$, $x2=\text{ceil}((M-sb-1)y+Ms)$, and $q=b(x2-Ms)/(b-Ms)$, wherein:

"F1", "F2", ..., "Fn", "G1", "G2", ..., "Gn", " ", " ", and "a" are commonly used by said encrypting unit and said decrypting unit;

said encrypting unit accepts original data as the data inputs, h1, h2, ..., hn, and outputs the data outputs, s1, s2, ..., sn, as encrypted data, and said decrypting unit accepts the encrypted data as the data inputs, k1, k2, ..., kn, and outputs the data outputs, e1, e2, ..., en as decrypted data.

9. A computer readable medium having stored thereon an encryption/decryption system comprising:

a multi-stage converter as an encrypting unit comprising:

a "u" number of converters M1, M2, ..., Mu, using:

an "n" (n≧1) number of conversion functions F1, F2, ..., Fn: A×A→A and their inverse conversion functions G1, G2, ..., Gn: A×A→A, with respect to a domain A, wherein, for arbitrary x A and y A, conditions of $Fi(Gi(x,y),y)=x$, and $Gi(Fi(x,y),y)=x$ are satisfied;

a unary arithmetic operation, :An→An, and its reverse unary arithmetic operation, :A×A→A, wherein, for arbitrary z An, conditions of $(z)=z$, and $(z)=z$ are satisfied; and a predetermined parameter, a A, and said converter comprising:

a generating unit accepting generative inputs, x1, x2, ..., xn A, whose length is "n" in total, and generating generative outputs, y1, y2, ..., yn A, using recurrence formulas $y1=F1(x1,a)$, and $yi+1=Fi+1(xi+1,yi)$ (for $1 \leq i \leq n-1$);

a data accepting unit accepting data inputs, k1, k2, ..., kn A, and giving the accepted data inputs as generative inputs to said generating unit;

a repetition controller giving the generative outputs from said generating unit as generative inputs to said generating unit, for an "m" ($m \geq 0$) number of times, and setting the last generative outputs as a random number sequence, r1, r2, ..., rn A;

a converting unit applying the unary arithmetic operation, , to the random number string, r1, r2, ..., rn A, to perform its data conversion, (e1, e2, ..., en)=(r1, r2, ..., rn); and outputting data outputs, e1, e2, ..., en, wherein at least one of the conversion functions, F1, F2, ..., Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$ma(x,b)=\text{ceil}(xMs/b)$ (for $1 \leq x \leq b$), and $ma(x,b)=\text{floor}(Ms(x-b)/(Ms-b))+1$ (for $b<x \leq Ms$), and the inverse function ma−1(•,•), is defined as:

$ma-1(y,b)=x1$ (for $q<x1$), and $ma-1(y,b)=x2$ (for $x1 \leq q$), where $x1=\text{floor}(M-sby)$, $x2=\text{ceil}((M-sb-1)y+Ms)$, and $q=b(x2-Ms)/(b-Ms)$; and a multi-stage key-input accepting unit which accepts parameter inputs a1, a2, ..., au A, and sets the "j"-th parameter input, aj, included in the accepted parameter inputs, as the predetermined parameter "a" of the converter Mj, wherein:

a converter M1 included in said "u" number of converters accepts multi-stage conversion inputs, k1, k2, ..., kn as the data inputs, the data outputs, which are output by the converter Mi ($1 \leq i \leq u-1$) included in said "u" number of converters, are given to the converter Mi+1 included in said "u" number of converters, as the data inputs, and a converter Mu, included in said "u" number of converters outputs the data outputs, e1, e2, ..., en, as multi-stage conversion outputs; and a multi-stage converter as a decrypting unit comprising:

a "u" number of converters, M1, M2, ..., Mu, using:

an "n" ($n \geq 1$) number of conversion functions F1, F2, ..., Fn: A×A→A and their inverse conversion functions G1, G2, ..., Gn: A×A→A, with respect to a domain A, wherein, for arbitrary x A and y A, conditions of $Fi(Gi(x,y),y)=x$, and $Gi(Fi(x,y),y)=x$ are satisfied;

a unary arithmetic operation, :An→An, and its reverse unary arithmetic operation, :A×A→A, wherein, for arbitrary z An, conditions of $(z)=z$, and $(z)=z$ are satisfied; and a predetermined parameter, a A, and said converter comprising:

a generating unit accepting generative inputs, x1, x2, ..., xn A, whose length is "n" in total, and generating generative outputs, y1, y2, ..., yn A, using recurrence formulas $y1=F1(x1,a)$, and $yi+1=Fi+1(xi+1,yi)$ (for $1 \leq i \leq n-1$);

a data accepting unit accepting data inputs, k1, k2, ..., kn A, and giving the accepted data inputs as generative inputs to said generating unit;

a repetition controller giving the generative outputs from said generating unit as generative inputs to said generating unit, for an "m" ($m \geq 0$) number of times, and setting the last generative outputs as a random number sequence, r1, r2, ..., rn A;

a converting unit applying the unary arithmetic operation, , to the random number string, r1, r2, ..., rn A, to perform its data conversion, (e1, e2, ..., en)=(r1, r2, ..., rn); and outputting data outputs, e1, e2, ..., en, wherein at least one of the conversion functions, F1, F2, ..., Fn, is either a function, ma(•,•), or an inverse function of ma(•,•), ma−1(•,•), and the function, ma(•,•), is defined, by positive integers M, s, "M"-number system rounding up function, ceil(•), and "M"-number system rounding down function, floor(•), as:

$ma(x,b)=\text{ceil}(xMs/b)$ (for $1 \leq x \leq b$), and $ma(x,b)=\text{floor}(Ms(x-b)/(Ms-b))+1$ (for $b<x \leq Ms$), and the inverse function ma−1(•,•), is defined as:

$ma-1(y,b)=x1$ (for $q<x1$), and $ma-1(y,b)=x2$ (for $x1 \leq q$), where $x1=\text{floor}(M-sby)$, $x2=\text{ceil}((M-sb-1)y+Ms)$, and $q=b(x2-Ms)/(b-Ms)$; and a multi-stage key-input accepting unit which accepts parameter inputs a1, a2, ..., au A, and sets the "j"-th parameter input, aj, included in the accepted parameter inputs, as the predetermined parameter "a" of the converter Mj, wherein:

a converter Mu, included in said "u" number of converters accepts multi-stage conversion inputs, h1, h2, ..., hn as the data inputs, data outputs, which are output by the converter Mi+1 ($1 \leq i \leq u-1$) included in said "u" number of converters, are given to the converter Mi included in said "u" number of converters, as the data inputs, and a converter M1 included in said "u" number of converters outputs data outputs, s1, s2, ..., sn as multi-stage conversion outputs, wherein:

"F1", "F2", ..., "Fn", "G1", "G2", ..., "Gn", " ", and " ", are commonly used by said encrypting unit and said decrypting unit, parameter inputs, a1, a2, . . . , au A, are commonly accepted by said encrypting unit and said decrypting unit, said encrypting unit accepts original data as the multi-stage conversion inputs, k1, k2, . . . , kn, and outputs the multi-stage conversion outputs, e1, e2, . . . , en, as encrypted data, and said decrypting unit accepts the encrypted data as the multi-stage conversion inputs, h1, h2, . . . , hn, and outputs the data outputs, s1, s2, . . . , sn, as decrypted data.

10. A computer readable medium having stored thereon an encryption/decryption system comprising:
a multi-stage converter as an encrypting unit comprising:
a "u" number of converters M1, M2, . . . , Mu, using:
an "n" (n≧1) number of conversion functions F1, F2, . . . , Fn: A×A→A and their inverse conversion functions G1, G2, . . . , Gn: A×A→A, with respect to a domain A,
wherein, for arbitrary x A and y A, conditions of $Fi(Gi(x,y),y)=x$, and $Gi(Fi(x,y),y)=x$ are satisfied;
a unary arithmetic operation, :An→An, and its reverse unary arithmetic operation, :A×A→A, wherein, for arbitrary z An, conditions of $(z)=z$, and $(z)=z$ are satisfied; and
a predetermined parameter, a A, and said converter comprising:
a generating unit accepting generative inputs, x1, x2, . . . , xn A, whose length is "n" in total, and generating generative outputs, y1, y2, . . . , yn A, using recurrence formulas $y1=F1(x1,a)$, and $yi+1=Fi+1(xi+1,yi)$ (for $1≦i≦n-1$);

a data accepting unit accepting data inputs, k1, k2, . . . , kn A, and giving the accepted data inputs as generative inputs to said generating unit;
a repetition controller giving the generative outputs from said generating unit as generative inputs to said generating unit, for an "m" (m≧0) number of times, and setting the last generative outputs as a random number sequence, r1, r2, . . . , rn A;
a converting unit applying the unary arithmetic operation, , to the random number string, r1, r2, . . . , rn A, to perform its data conversion, (e1, e2, . . . , en)=(r1, r2, . . . , rn); and
outputting data outputs, e1, e2, . . . , en,
wherein at least one of the conversion functions, F1, F2, . . . , Fn, is either a function, ma(•,•), or an inverse function of ma(•,•), ma-1(•,•), and the function, ma(•,•), is defined, by positive integers M, s, "M"-number system rounding up function, ceil(•), and "M"-number system rounding down function, floor(•), as:

$ma(x,b)=ceil(xMs/b)$ (for $1≦x≦b$), and $ma(x,b)=floor(Ms(x-b)/(Ms-b))+1$ (for $b<x≦Ms$), and the inverse function ma-1(•,•), is defined as:

$ma-1(y,b)=x1$ (for $q<x1$), and $ma-1(y,b)=x2$ (for $x1≦q$), where $x1=floor(M-sby)$, $x2=ceil((M-sb-1)y+Ms)$, and $q=b(x2-Ms)/(b-Ms)$; and a multi-stage key-input accepting unit which accepts parameter inputs a1, a2, . . . , au A, and sets the "j"-th parameter input, aj, included in the accepted parameter inputs, as the predetermined parameter "a" of the converter Mj,
wherein: a converter M1 included in said "u" number of converters accepts multi-stage conversion inputs, k1, k2, . . . , kn as the data inputs, the data outputs, which are output by the converter Mi ($1≦i≦u-1$) included in said "u" number of converters, are given to the converter Mi+1 included in said "u" number of converters, as the data inputs, and a converter Mu, included in said "u" number of converters outputs the data outputs, e1, e2, . . . , en, as multi-stage conversion outputs; and
a multi-stage converter as a decrypting unit comprising:
a "u" number of converters, M1, M2, . . . , Mu, using:
an "n" (n≧1) number of conversion functions F1, F2, . . . , Fn: A×A→A and their inverse conversion functions G1, G2, . . . , Gn: A×A→A, with respect to a domain A,
wherein, for arbitrary x A and y A, conditions of $Fi(Gi(x,y),y)=x$, and $Gi(Fi(x,y),y)=x$ are satisfied;
a unary arithmetic operation, :An→An, and its reverse unary arithmetic operation, :A×A→A, wherein, for arbitrary z An, conditions of $(z)=z$, and $(z)=z$ are satisfied; and
a predetermined parameter, a A, and said converter comprising:
a generating unit accepting generative inputs, x1, x2, . . . , xn A, whose length is "n" in total, and generating generative outputs, y1, y2, . . . , yn A, using recurrence formulas $y1=F1(x1,a)$, and $yi+1=Fi+1(xi+1,yi)$ (for $1≦i≦n-1$);

a data accepting unit accepting data inputs, k1, k2, . . . , kn A, and giving the accepted data inputs as generative inputs to said generating unit;
a repetition controller giving the generative outputs from said generating unit as generative inputs to said generating unit, for an "m" (m≧0) number of times, and setting the last generative outputs as a random number sequence, r1, r2, . . . , rn A;
a converting unit applying the unary arithmetic operation, , to the random number string, r1, r2, . . . , rn A, to perform its data conversion, (e1, e2, . . . , en)=(r1, r2, . . . , rn); and
outputting data outputs, e1, e2, . . . , en,
wherein at least one of the conversion functions, F1, F2, . . . , Fn, is either a function, ma(•,•), or an inverse function of ma(•,•), ma-1(•,•), and the function, ma(•,•), is defined, by positive integers M, s, "M"-number system rounding up function, ceil(•), and "M"-number system rounding down function, floor(•), as:

$ma(x,b) = \text{ceil}(xMs/b)$ (for $1 \leq x \leq b$), and $ma(x,b) = \text{floor}(Ms(x-b)/(Ms-b)+1$ (for $b < x \leq Ms$), and the inverse function $ma-1(•,•)$, is defined as:

$ma-1(y,b) = x1$ (for $q < x1$), and $ma-1(y,b) = x2$ (for $x1 \leq q$), where $x1 = \text{floor}(M-sby)$, $x2 = \text{ceil}((M-sb-1)y+Ms)$, and $q = b(x2-Ms)/(b-Ms)$; and a multi-stage key-input accepting unit which accepts parameter inputs a1, a2, . . . , au A, and sets the "j"-th parameter input, aj, included in the accepted parameter inputs, as the predetermined parameter "a" of the converter Mj, wherein:

a converter Mu, included in said "u" number of converters accepts multi-stage conversion inputs, h1, h2, . . . , hn as the data inputs, data outputs, which are output by the converter Mi+1 ($1 \leq i \leq u-1$) included in said "u" number of converters, are given to the converter Mi included in said "u" number of converters, as the data inputs, and a converter M1 included in said "u" number of converters outputs data outputs, s1, s2, . . . , sn as multi-stage conversion outputs, wherein:

"F1", "F2", . . . , "Fn", "G1", "G2", . . . , "Gn", " ", and " ", are commonly used by said encrypting unit and said decrypting unit, parameter inputs, a1, a2, . . . , au, are commonly accepted by said encrypting unit and said decrypting unit, said encrypting unit accepts original data as multi-stage conversion inputs, h1, h2, . . . , hn, and outputs the multi-stage conversion outputs, s1, s2, . . . , sn, as encrypted data, and said decrypting unit accepts the encrypted data as the multistage conversion inputs, k1, k2, . . . , kn, and outputs the data outputs, e1, e2, . . . , en as decrypted data.

\* \* \* \* \*